US011059587B2

(12) United States Patent
Finlay et al.

(10) Patent No.: US 11,059,587 B2
(45) Date of Patent: Jul. 13, 2021

(54) SEAT BACK DECOUPLER MECHANISM

(71) Applicant: B/E Aerospace, Inc., Winston-Salem, NC (US)

(72) Inventors: Travis K. Finlay, Winston-Salem, NC (US); Sebastián Aberastury, Buenos Aires (AR)

(73) Assignee: B/E Aerospace, Inc., Winston-Salem, NC (US)

( * ) Notice: Subject to any disclaimer, the term of this patent is extended or adjusted under 35 U.S.C. 154(b) by 211 days.

(21) Appl. No.: 16/218,731

(22) Filed: Dec. 13, 2018

(65) Prior Publication Data

US 2019/0112051 A1 Apr. 18, 2019

Related U.S. Application Data

(63) Continuation-in-part of application No. 15/610,167, filed on May 31, 2017, now Pat. No. 10,414,501.

(51) Int. Cl.
*B64D 11/06* (2006.01)

(52) U.S. Cl.
CPC ........ *B64D 11/0619* (2014.12); *B64D 11/064* (2014.12)

(58) Field of Classification Search
CPC .............. B64D 11/0619; B64D 11/064; B60N 2/0276; B60N 2/42; B60N 2/4214; B60N 2/4221; B60N 2/4228; B60N 2/427; B60N 2/42781; B60N 2205/20
See application file for complete search history.

(56) References Cited

U.S. PATENT DOCUMENTS

| 5,320,308 A * | 6/1994 | Bilezikjian | B64D 11/064 244/122 R |
| 6,478,256 B1 * | 11/2002 | Williamson | B64D 11/0619 244/122 R |
| 6,669,295 B2 * | 12/2003 | Williamson | B60N 2/062 297/362.13 |
| 8,864,227 B2 * | 10/2014 | Funke | B60N 2/4214 297/216.13 |
| 10,384,783 B2 * | 8/2019 | Murray | B60N 2/42781 |
| 10,414,501 B2 * | 9/2019 | Thompson | B64D 11/064 |
| 10,689,118 B2 * | 6/2020 | Pierson-Moonan | B60N 2/42781 |
| 2017/0259713 A1 * | 9/2017 | Kostin | B60N 2/0232 |

\* cited by examiner

*Primary Examiner* — Ryan D Kwiecinski
(74) *Attorney, Agent, or Firm* — Suiter Swantz pc llo

(57) ABSTRACT

An aircraft passenger seat with dynamic seat back breakover including a pivotally-attached seat back element and a seat back breakover mechanism including an articulating weighted inertia linkage operable for coupling the seat back element in a first operating condition in which the seat back element is movable between an upright taxi takeoff and landing (TTOL) position and a reclined position, and decoupling the seat back element in a second operating condition to allow the seat back element to move forward past the upright position, the first operating condition corresponding to inertial loading below a predetermined threshold value and the second operating condition corresponding to inertial loading above the predetermined threshold value.

19 Claims, 25 Drawing Sheets

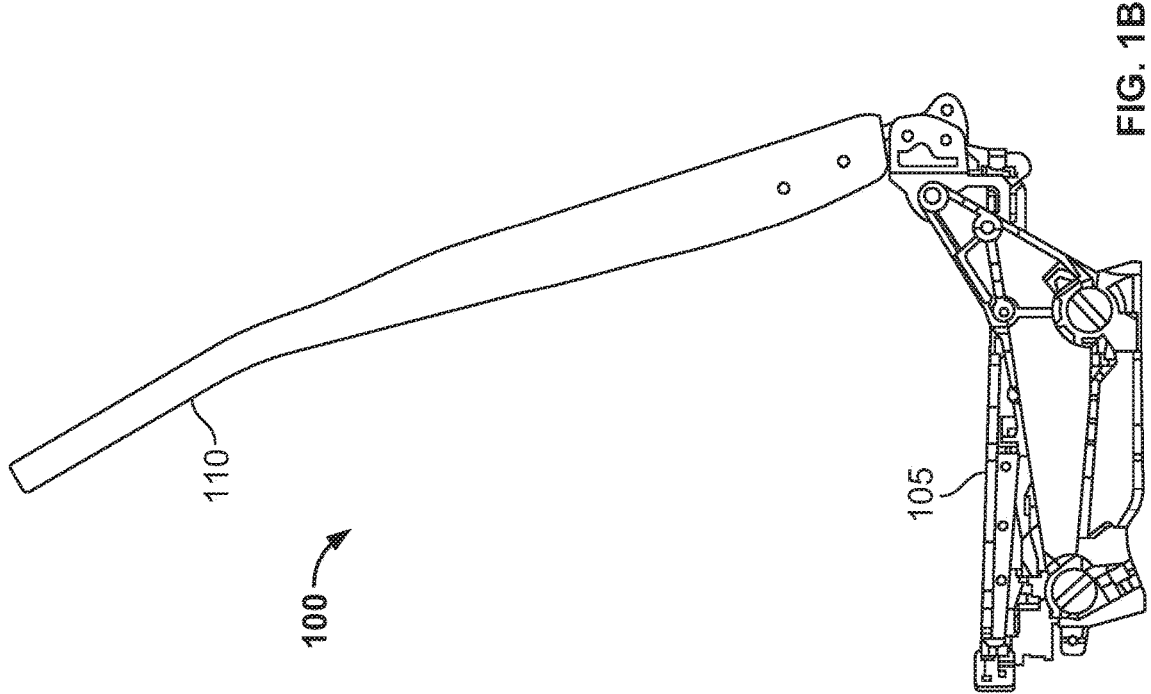
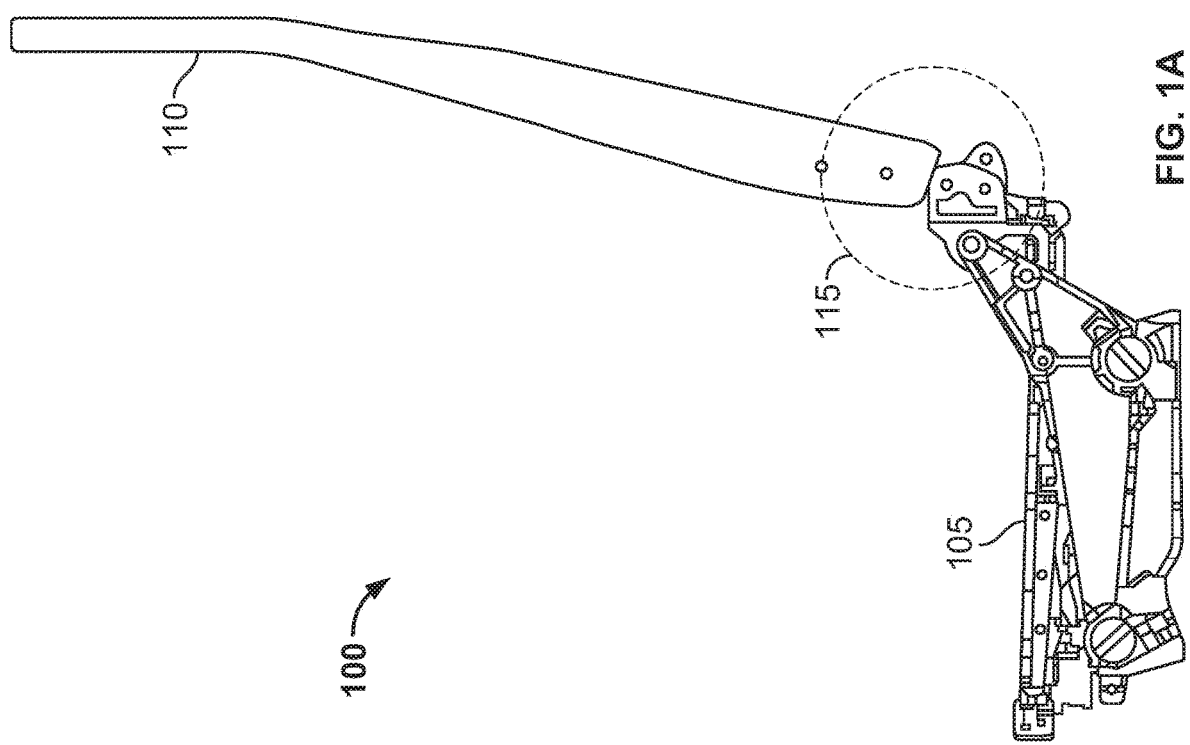

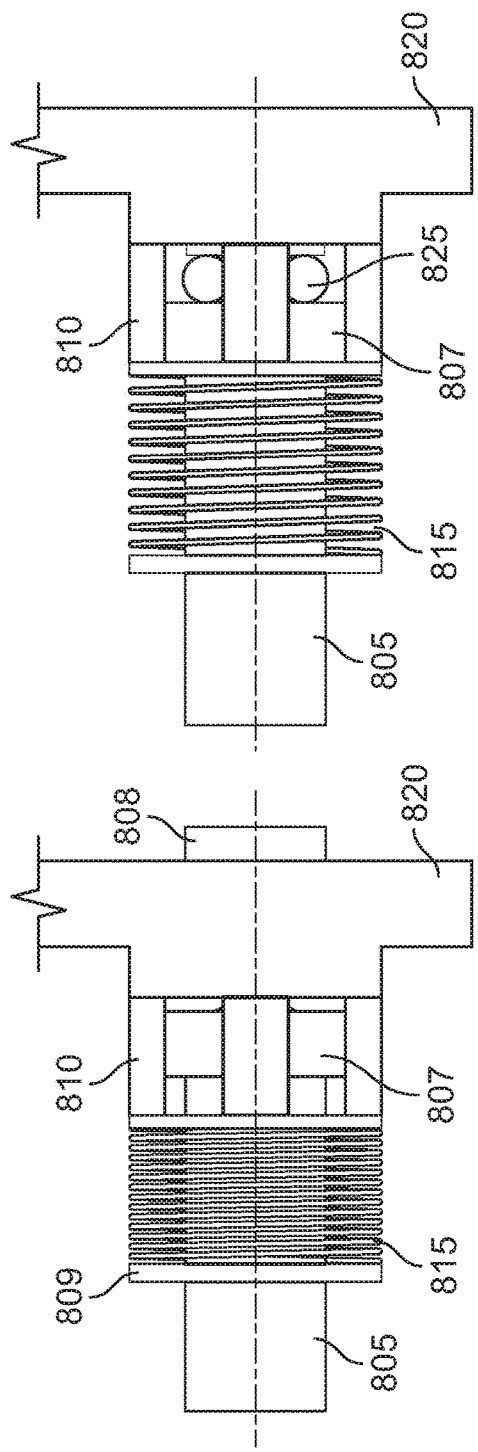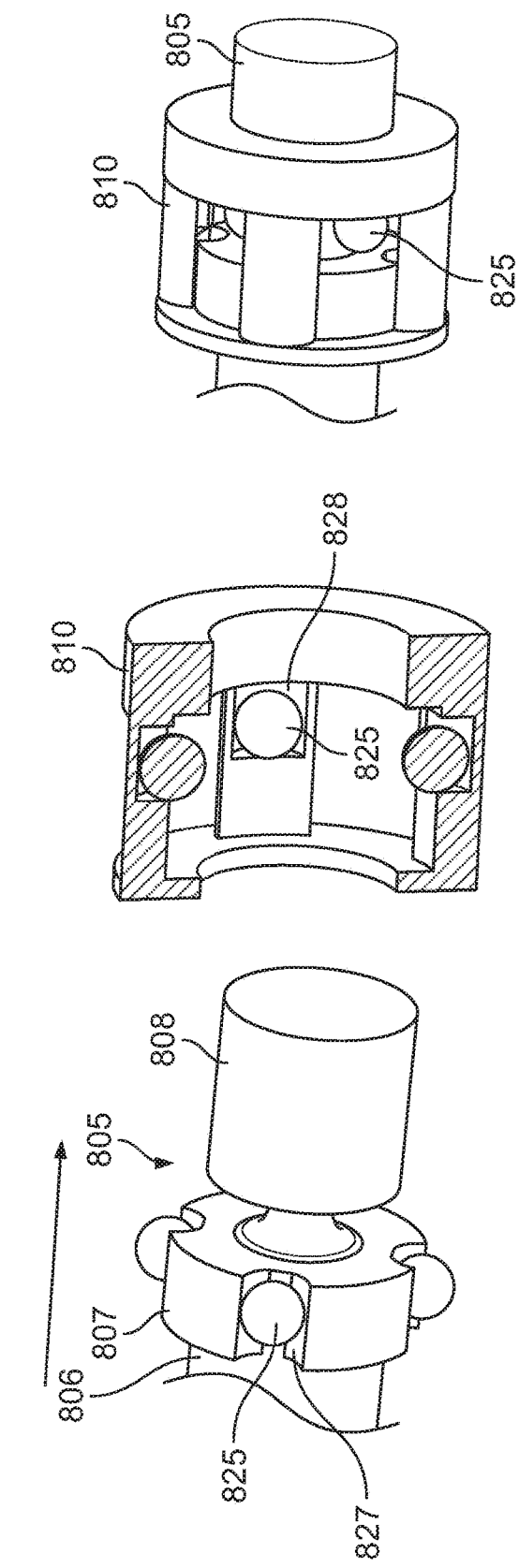

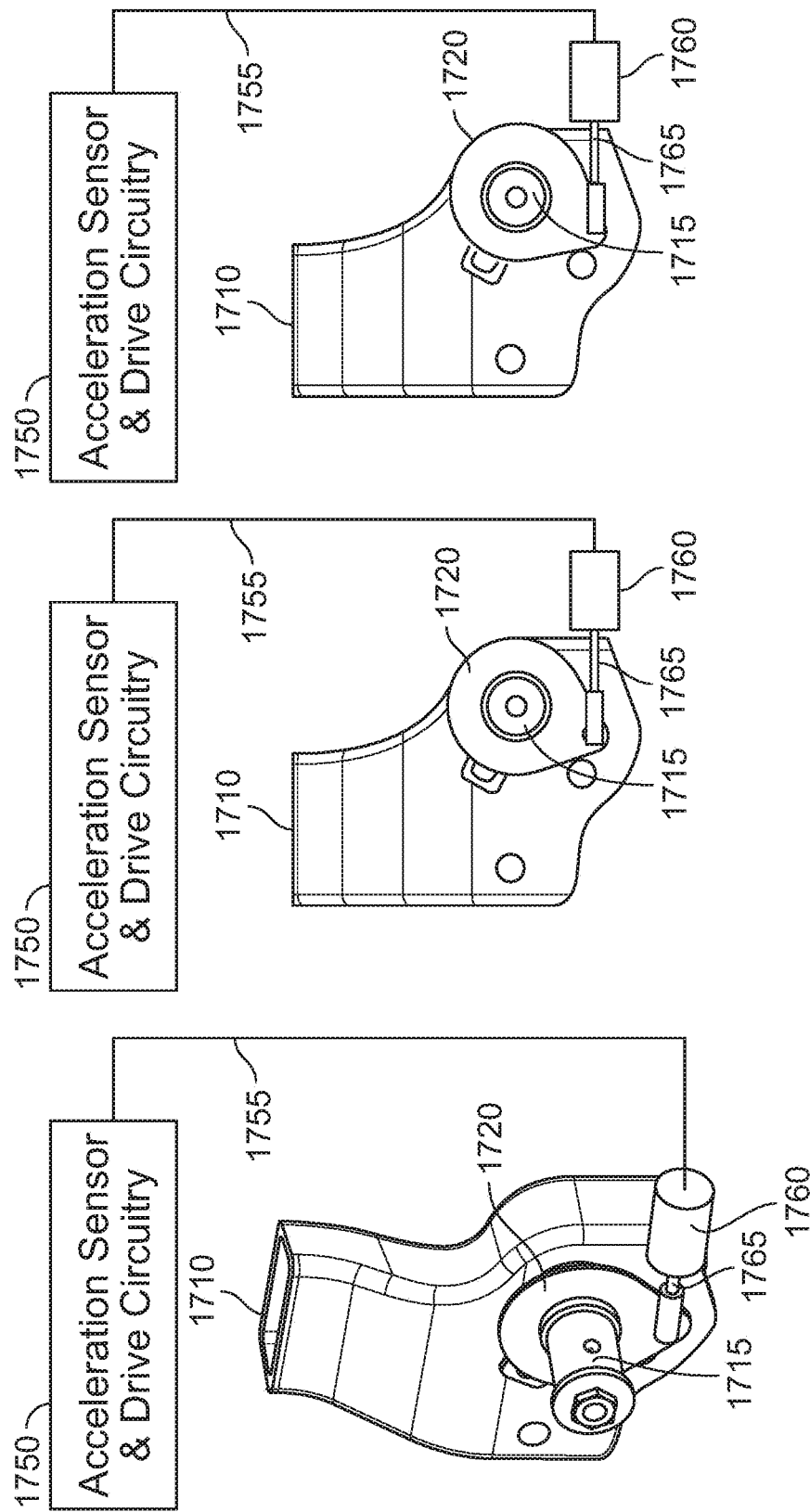

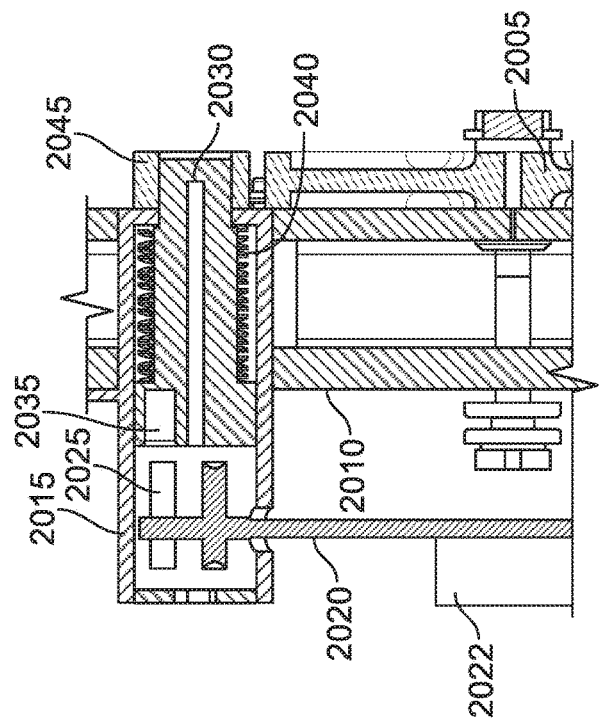
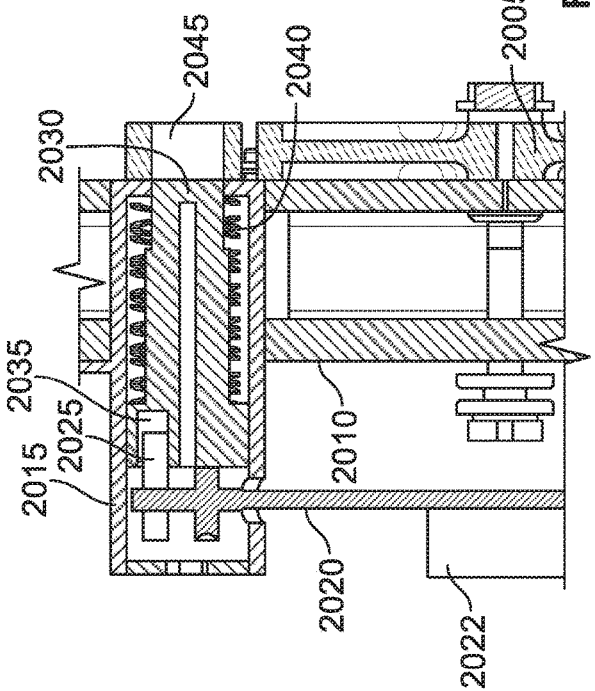
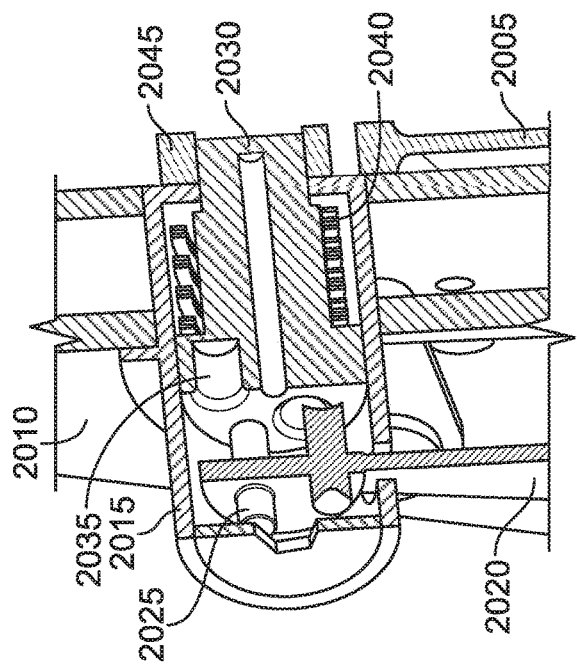
FIG. 19A
FIG. 19B
FIG. 19C

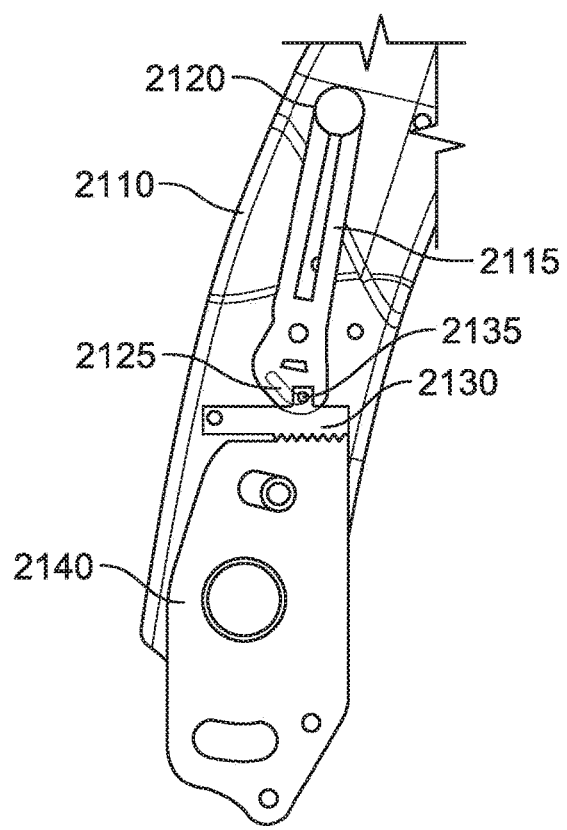
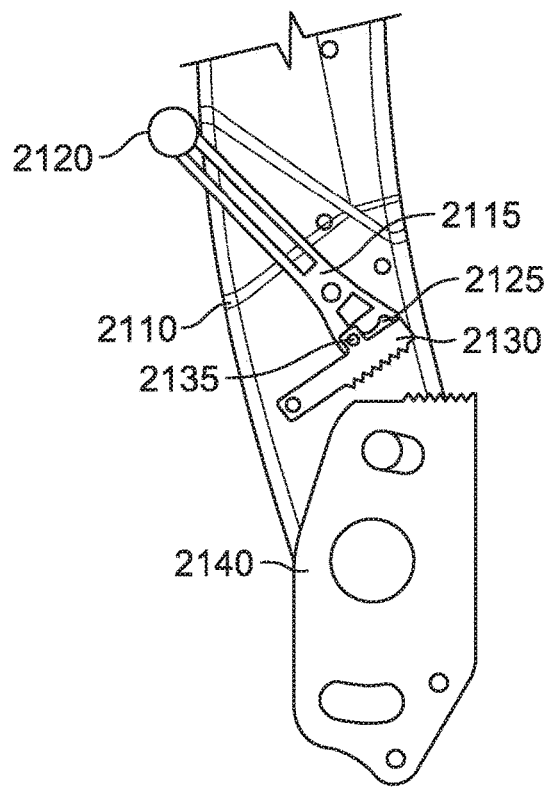
FIG. 20A
FIG. 20B

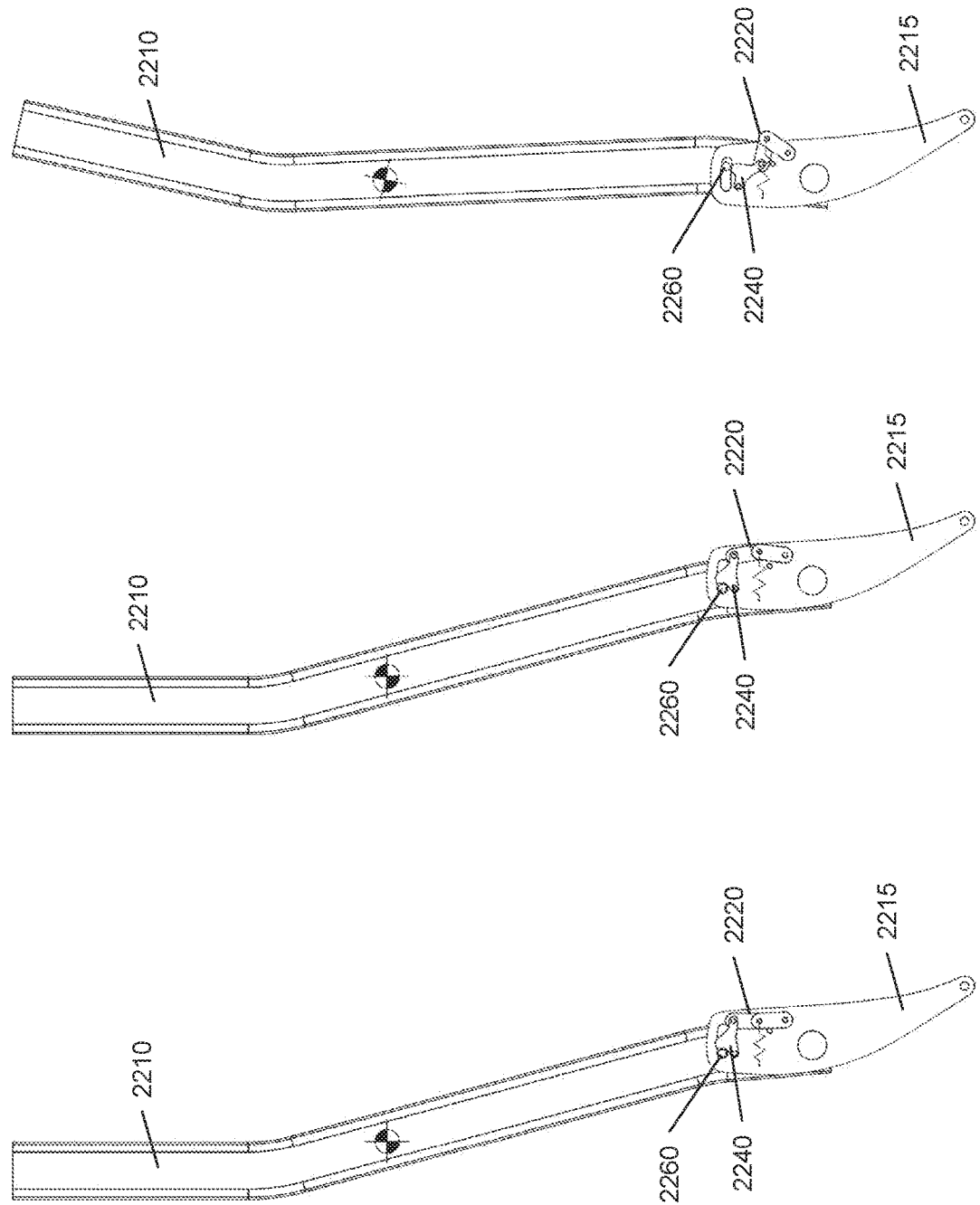

SEAT BACK DECOUPLER MECHANISM

RELATED APPLICATION AND INCORPORATION BY REFERENCE

This continuation-in-part application claims priority from U.S. application Ser. No. 15/610,167 filed May 31, 2017, the entirety of which is incorporated by reference herein.

BACKGROUND

The present disclosure relates to a passenger seat, or "seating unit," such as an aircraft passenger seat, equipped with a dynamic breakover assembly.

Aircraft passenger seats are designed and constructed according to government regulations and aircraft manufacturer specifications. Virtually every aspect of seat design is thus constrained by requirements imposed by safety, weight and cost considerations. Within these limits the seat must also be aesthetically pleasing, comfortable to a seated passenger, and functional for the passenger as well as airline maintenance, repair and cleaning crews.

Regulatory requirements for aircraft components in the US are based on Title 14 of the Code of Federal Regulations (CFR) Part 25, which sets out standards for aircraft airworthiness. For aircraft passenger seats, sections § 25.561 and § 25.562 of Title 14 specify requirements for seat structures that may give passengers a reasonable chance of escaping serious injury in a mirror crash-landing situation.

Main cabin or "coach" class seats are typically constructed with a seat bottom frame (bottom chassis) formed from two or more leg modules and section assembly modules joined together by several beam elements that connect the leg modules and section assembly modules in spaced-apart relation to each other, and collectively form a so-called "ladder frame assembly." A seat bottom unit is mounted on the ladder frame assembly. The seat bottom unit is usually stationary. A seat back unit is usually pivotally-mounted between two of the section assembly modules so that the angle of the seat back unit can be controlled for comfort, safety and passenger ingress and egress past the rear of the seat. Because of the relatively short pitch between rows of seats in the main cabin, the normal range of movement of the seat back unit is limited. The degree of rearward recline movement is constrained by the position of the rearward row of seats and the requirement to leave the aft-seated passenger with sufficient room to enter and exit his or her own seat as well as use the meal tray. The degree of forward movement of the seat back unit is typically limited to a position where the seat back is in a "full upright" position for take-off and landing, and for meal service.

Passenger seats are typically designed whereby the seat back will not move beyond these positions under normal circumstances (including abuse loads). However, provision must also be made for the abnormal situation where severe G-force loads may propel a passenger forward toward the seat back directly in front of them. In such cases, the seat back must be allowed to fold over (i.e., breakover) the seat bottom in a controlled manner to minimize or reduce injury to a passenger who may be thrown against the seat back during an emergency deceleration (i.e., high G-force) event.

For aircraft passenger seats, 14 CFR § 25.562 requires that for a high G-force event (e.g., 16 Gs) where head contact with seats or other structures may occur, some type of protection must be provided so that the so-called "Head Injury Criterion" (HIC) does not exceed 1000 units. 14 CFR § 25.785 has a primary goal of protecting occupants from serious injury during landing condition, including injurious interactions of the head and neck (ref ANM-115-17-002). Conventional methods to generate a low HIC score typically involve either spacing passenger seats far enough apart so that a passenger's head will not make contact with the forward seat, thereby severely limiting seating options for seating arrangements which increase the number of seats within the cabin, or building a breakover mechanism into the seat back. In breakover mechanism designs, breakover may occur when a passenger impacts the forward seatback using a force capable of breaking a weak or sacrificial component (e.g., breakable bushing part, shear pin, etc.), which was purposely built into the seat structure, allowing the seat back to begin to tilt forward upon impact. The movement of the seat back in response to a passenger impact may dissipate energy and lower the HIC score. However, these breakover mechanisms can also impact neck injury potential. For example, a reduction in HIC score may not always translate to a reduction of neck injury potential and can even increase the neck injury potential. Therefore, a proper balance in breakover design must be achieved in order to satisfy both requirements. In addition to the HIC score and neck injury potential, damage done to the seat back during a high G-force event must not prevent passenger egress or harm the passengers after an event. For example, the seat must stay largely intact and no sharp edges may occur. Furthermore, in some passenger seat configurations, there may also be neck injury criteria. As described above, the prior art breakover mechanisms typically require a passenger make contact with the seat back to initiate the breakover.

BRIEF SUMMARY

In one aspect, embodiments of the inventive concepts disclosed herein are directed to an aircraft passenger seat with dynamic seat back breakover including a seat back element and a seat back breakover mechanism including a breakover link and an articulating weighted inertia linkage, wherein the seat back element is pivotally-attached to the breakover link and the articulating weighted inertia linkage is operable for coupling the seat back element to the breakover link in a first operating condition in which the seat back element is movable with the breakover link between an upright taxi takeoff and landing (TTOL) position and a reclined position of the seat back element, and decoupling the seat back element from the breakover link in a second operating condition to allow the seat back element to move forward relative to the breakover link past the upright position, and wherein the first operating condition corresponds to inertial loading on the seat back element below a predetermined threshold value and the second operating condition corresponds to inertial loading on the seat back element above the predetermined threshold value.

In some embodiments, the second operating condition corresponds to a crash event.

In some embodiments, the predetermined threshold value is at least 9 G.

In some embodiments, the articulating weighted inertia linkage includes a lower link pivotally attached at one end to the breakover link, a pawl link pivotally attached at one end to the breakover link, and an upper link pivotally attached to each of the lower link and the pawl link and free of attachment to the breakover link, wherein in a coupled state corresponding to the first operating condition the articulating weighted inertia linkage prevents relative movement between the seat back element and the breakover link, and in a decoupled state corresponding to the second operating condition the articulating weighted inertia linkage allows relative movement between the seat back element and the breakover link.

In some embodiments, the breakover mechanism includes a tuning spring coupled between the breakover link and the articulating weighted inertia linkage operable for setting the predetermined threshold value of inertial loading and biasing the articulating weighted inertia linkage toward the coupled state.

In some embodiments, the breakover link includes a rotation-limiting post for preventing the articulating weighted inertia linkage from rotating rearward past the coupled state.

In some embodiments, the seat back element carries a seat back pin engaged in an elongated slot of the breakover link, wherein in the coupled state in the first operating condition the pawl link engages the seat back pin to prevent seat back pin travel along the elongated slot, and in the decoupled state in the second operating condition the pawl link is pivoted out of engagement with the seat back pin to free the seat back pin to travel along a length of the elongated slot.

In some embodiments, the breakover mechanism includes a weighted pendulum coupled to the breakover link operable for applying a horizontal pushing force on the articulating weighted inertia linkage in the second operating condition.

In some embodiments, the breakover mechanism includes a weighted pendulum coupled to the articulating weighted inertia linkage operable for applying a horizontal pulling force on the articulating weighted inertia linkage in the second operating condition.

In another aspect, embodiments of the inventive concepts disclosed herein are directed to an aircraft passenger seat with dynamic seat back breakover including a seat back element configured to move in a first operating condition between an upright taxi takeoff and landing (TTOL) position and a reclined sitting position, and in a second operating conditioned move forward past the upright sitting position, the first operating condition corresponding to inertial loading on the seat back element below a predetermined threshold value and the second operating condition corresponding to inertial loading on the seat back element above the predetermined threshold value, and a seat back breakover mechanism including a breakover link and an articulating weighted inertia linkage, the articulating weighted inertia linkage operable for coupling seat back element and breakover link movement in the first operating condition and decoupling seat back element and breakover link movement in the second operating condition, wherein the articulating weighted inertia linkage decouples the seat back element and breakover link movement in response to inertial loading above the predetermined threshold value.

In a further aspect, embodiments of the inventive concepts disclosed herein are directed to an aircraft passenger seat with dynamic seat back breakover including a pivotally-attached seat back element, and a seat back breakover mechanism including an articulating weighted inertia linkage operable for coupling the seat back element in a first operating condition in which the seat back element is movable between an upright taxi takeoff and landing (TTOL) position and a reclined position, and decoupling the seat back element in a second operating condition to allow the seat back element to move forward past the upright position, the first operating condition corresponding to inertial loading below a predetermined threshold value and the second operating condition corresponding to inertial loading above the predetermined threshold value.

In some embodiments, the articulating weighted inertia linkage includes a lower link pivotally attached at one end to the breakover link, a pawl link pivotally attached at one end to the breakover link, and an upper link pivotally attached to each of the lower link and the pawl link and free of attachment to the breakover link, wherein a seat back pin carried on the seat back element is engaged in an elongated slot of a breakover link, and wherein in the first operating condition the pawl link engages the seat back pin to prevent seat back pin travel along a length of the elongated slot and in the second operating condition the pawl link is pivoted out of engagement with the seat back pin to free the seat back pin to travel along the length of the elongated slot.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1A illustrates an exemplary side elevation of the frame of an aircraft passenger seat with the seat back shown in the full upright position;

FIG. 1B illustrates an exemplary side elevation of the frame of an aircraft passenger seat after a high G-force event;

FIGS. 8A-8E illustrate various views of the hinge area and breakover mechanism of an aircraft passenger seat according to yet another embodiment of the present disclosure;

FIGS. 16A-16C illustrate an exemplary implementation of a breakover actuation mechanism for some embodiments of the present disclosure;

FIGS. 19A-19C illustrate views of the hinge area and breakover mechanism of an aircraft passenger seat according to yet another embodiment of the present disclosure;

FIGS. 20A and 20B illustrate views of the hinge area and breakover mechanism of an aircraft passenger seat according to yet another embodiment of the present disclosure;

FIGS. 23A-23C illustrate sequential views of the decoupling of the seat back element utilizing the breakover actuation mechanism of the embodiment shown in FIG. 21;

DETAILED DESCRIPTION OF EXEMPLARY EMBODIMENTS

Figure 2:
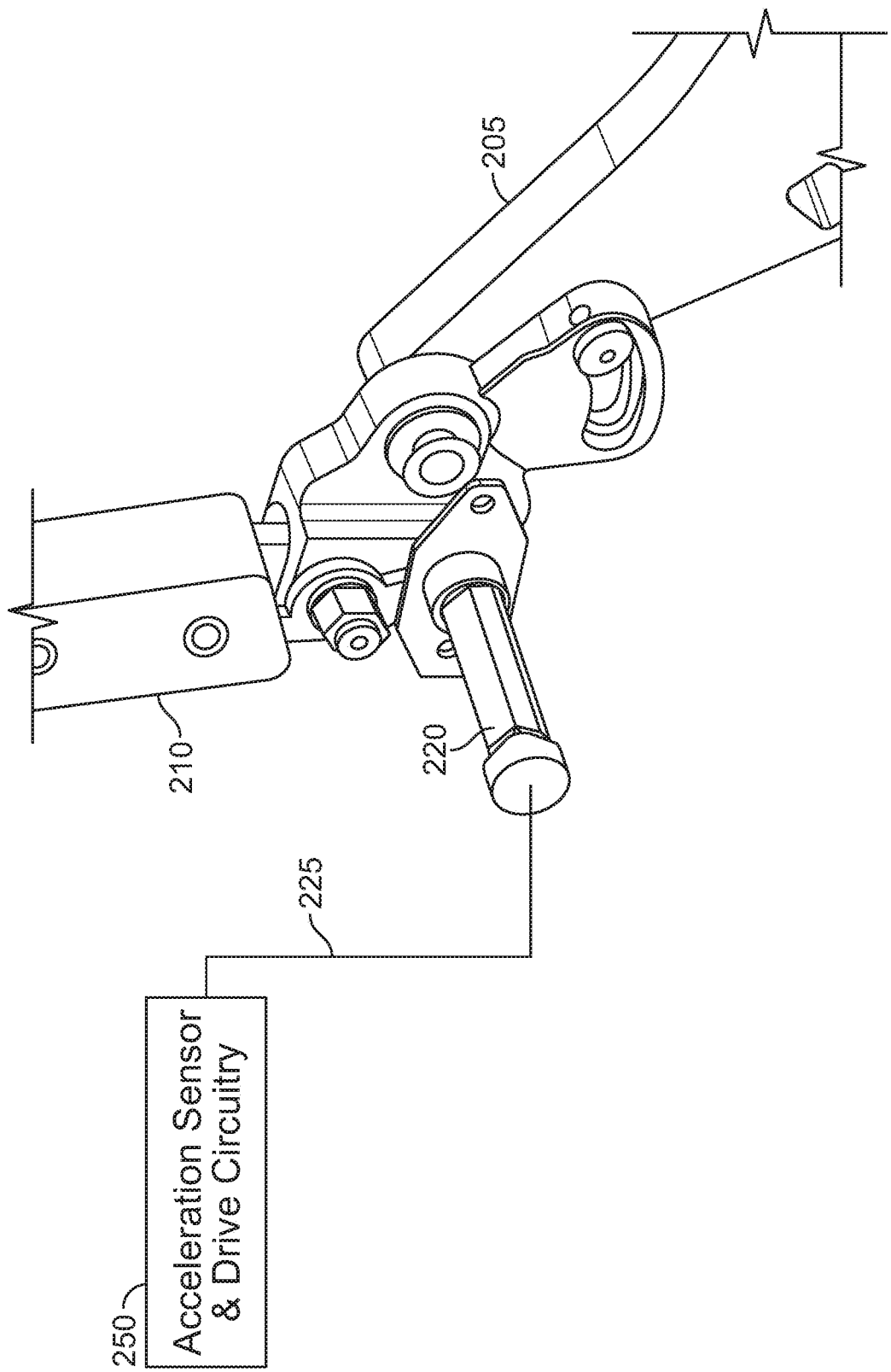
FIG. 2 illustrates an inside view of the hinge area of an aircraft passenger seat according to some embodiments of the present disclosure.

The inventive concepts are described hereinafter with reference to the accompanying drawings in which exemplary embodiments are shown. However, the inventive concepts may be embodied in many different forms and should not be construed as limited to the representative embodiments set forth herein.

In certain embodiments, an aircraft passenger seat having a dynamic breakover assembly can include a seat bottom frame and a seat back pivotally-mounted to the seat bottom frame that allows the angle of the seat back relative to the seat bottom frame to be varied from an upright taxi takeoff and landing (TTOL) position to a reclined position. The seat may include a mechanism for sensing acceleration corresponding to a force indicative of an abnormal event, and a breakover mechanism coupled to the seat bottom frame and the seat back in which the means for sensing acceleration is coupled to the breakover mechanism. The breakover mechanism can prevent movement of the seat back in a forward direction past the TTOL position during normal use and permit forward movement of at least a portion of the seat back in the forward direction past the TTOL position upon activation by the mechanism for sensing acceleration.

In certain embodiments, the mechanism for sensing acceleration may include acceleration sensor and drive circuitry that senses an emergency deceleration (e.g., high G-force) event and provides a drive current through a cable to an actuator that retracts a shaft, thereby uncoupling the seat back from the seat bottom and allowing forward movement of the seat back. In certain embodiments, the acceleration sensor may include any combination of multi-axis accelerometers, gyroscopes, and magnetometers. In some implementations, the actuator may be a linear solenoid. In other implementations, the mechanism for sensing acceleration may include an inertial release assembly having a weighted end that may rotate in forward direction during a high G-force event, causing the seat back to become uncoupled from the seat bottom.

In some embodiments, the acceleration sensor and drive circuitry may be centrally located amidst multiple seats or within the aircraft cabin and provide the drive current for multiple actuators. For example, the acceleration sensor and drive circuitry may be located in or near a particular seat or group of seats for activating breakover in a designated section of passenger seats. In one example, the acceleration sensor and drive circuitry may be dedicated to a contiguous seating row (e.g., two or more seats positioned proximate each other and spanning from an aisle to a window). In another example, the acceleration sensor and drive circuitry may be dedicated to a passenger seating cluster (e.g., a grouping of passenger seats arranged between a fore monument or divider and an aft monument or divider).

Benefits of the embodiments described herein may include prevention or reduction of injuries to the passengers seated in the aircraft seats in situations where severe G-force loads may propel the passengers forward toward the seat back directly in front of them. The movement of the seat back due to the action of the breakover mechanism in response to a passenger impact during a high G-force event may dissipate energy and lower the Head Injury Criterion (HIC) score as well as reduce neck injury, egress, or harm potential, to ensure adherence to requirements delineated in 14 CFR § 25.785 without having to increase an amount of space between passenger seats.

As used herein, "normal" load refers to those loads which are normally applied to the seat back during normal use, and includes loads imposed by passengers pushing or leaning on the seat back unit during ingress and egress, and mirror rear impacts such as may occur during moderately hard landings or "short" stops upon landing. As used herein, "abnormal" load refers to any load in excess of a normal load (e.g., as may happen during a high G-force event) and as specified in government regulations or aircraft manufacturer specifications. These requirements are well-known to all aircraft seat manufacturers. In general, such abnormal loads may be in the range of 16 Gs.

Referring to the figures, FIGS. 1A and 1B illustrate a side elevation of a typical aircraft passenger seat 100, including a seat bottom frame 105 and a seat back 110 (wherein the seat and back cushions have been omitted for clarity). In FIG. 1A, the seat back 110 is in the normal (full) upright position for taxi, take-off, and landing (TTOL). Under normal in-service conditions, seat back 110 may be allowed to recline rearward, but would be prevented from moving further forward than the full upright (TTOL) position illustrated in FIG. 1A.

In some embodiments, the seat 100 may include a novel breakover mechanism at a hinge area 115 between a back end of the seat bottom frame element 105 and lower end of seat back element 110 that may be triggered during a high G-force event at a predetermined acceleration of the seat 100. In some implementations, the acceleration may cause the seat back 110 to begin to fold forward over the seat bottom frame 105, as illustrated in FIG. 1B, before a passenger makes contact with the seat back, which may help to lessen the impact of the passenger's head against a forward seat. In addition, the fold over action performed by the breakover mechanism may also reduce the load on the seat components and other equipment during the high G-force event and thereby reduce or eliminate breakage of seat parts. Furthermore, a breakover mechanism triggered by a predetermined acceleration may also move structures out of a path of the passenger's head to reduce the possibility or severity of neck injury. In some implementations, instead of or in addition to the breakover mechanism located at the hinge area 115, the seat back element 110 may be segmented and include an additional hinge and associated breakover mechanism at mid-seat back such that the additional breakover mechanism may cause a portion of the seat back element 110 above the additional breakover mechanism to rotate forward. Details regarding design options for the breakover mechanism for the seat 100 are discussed further below.

FIG. 2 illustrates an inside view of a hinge area (shown as dotted area 115 in FIG. 1) of an aircraft passenger seat according to some embodiments of the present disclosure. In some embodiments, during a high G-force event, acceleration sensor and drive circuitry 250 may sense the high G-force and provide a drive current through a cable 225 to an actuator 220 which may be configured to retract a shaft (e.g., pin, rod, annular member, etc.) which, under normal conditions, limits the movement of the seat back element 210 with respect to the seat bottom frame element 205. When the shaft is retracted, the seat back element 210 becomes uncoupled from the seat bottom frame element 205, which allows the seat back element 210 to rotate forward past the full, upright (TTOL) position. The actuator 220, in a first example, may be a pyrotechnic actuator, which may include, among other components, an electrically ignited pyrotechnic charge. Small pyrotechnic actuators can typically exert significant force (e.g., tens or hundreds of kilograms) and achieve actuation speeds as low as several milliseconds. However, pyrotechnic actuators may be limited to one or only a few actuations before needing to be replaced. The actuator 220, in a second example, may be a linear solenoid. A linear solenoid may require a high drive current to exert significant force in a short time period, but a linear solenoid can be used thousands of times without replacement. A speed of deployment of the solenoid is tunable in order to optimize a velocity differential between a portion of the seatback proximate a head of the passenger and a portion of the seatback proximate a lower back of the passenger.

In some implementations, the acceleration sensor and drive circuitry 250 may include sensors that are able to detect changes in velocity of elements to which the sensors are connected such as elements of the seat 100 (e.g., the seat back element 210, the seat bottom frame element 205) or cabin elements proximate the seat 100 or within the aircraft cabin that correspond to a high G-force event and may include any combination of multi-axis accelerometers, gyroscopes, and magnetometers. In some implementations, accelerometers may be configured to measure an amount of acceleration in a particular direction, gyroscopes may be configured to measure changes in orientation or relative velocity, and magnetometers may measure changes in magnetic fields that can be used to determine absolute orientation of the elements to which the magnetometers are connected. Because accelerometers, gyroscopes, and magnetometers may be used to measure different features of inertial movement, the sensor outputs may be combined into a single inertial measurement unit (IMU).

Although illustrated as being dedicated to a single seat unit, in other embodiments, the acceleration sensor and drive circuitry 250 may be centrally located amidst multiple seats or within the aircraft cabin and provide the drive current for multiple actuators 220. For example, the acceleration sensor and drive circuitry 250 may be located in or near a particular seat (or group of seats) for activating breakover in a designated section of passenger seats 100. In one example, the acceleration sensor and drive circuitry 250 may be dedicated to a contiguous seating row (e.g., two or more seats 100 positioned proximate each other and spanning from an aisle to a window). In another example, the acceleration sensor and drive circuitry 250 may be dedicated to a passenger seating cluster (e.g., a grouping of passenger seats arranged between a fore monument or divider and an aft monument or divider). The passenger seating cluster may or may not be further segmented by one or more aisles arranged within the cabin section. In an illustrative example, the passenger seating cluster may be organized between a first class divider and a lavatory monument, from the windows to an aisle region. Other divisions of passenger seats are possible. Divisions of passenger seats, in one example, may be dictated in part based upon a distance between the acceleration sensor and drive circuitry 250 which may affect timing or consistency of triggering the breakover mechanism in a particular passenger seat. In another example, divisions of passenger seats may be dictated in part upon maintaining protected connections between the acceleration sensor and drive circuitry 250 and the individual breakover mechanism. In illustration, in a wired configuration, wires may be maintained above an under-seat stowage area and a seat cushion such that connections cannot be reached and damaged through passenger use of the seats.

In another implementation, the acceleration sensor and drive circuitry 250 may be wirelessly connected to the actuator 220 for one or more seats 100 through a short-range wireless communication network, such as a Wi-Fi, Li-Fi, Bluetooth, Zigbee, or Ultra Wide Band (UWB) network. For example, the acceleration sensor and drive circuitry 250 and actuator 220 may each include wireless communication circuitry, such as a radio, transceiver, and other associated circuitry, that allow the acceleration sensor and drive circuitry 250 and actuator 220 to communicate via the wireless communication network. The type of wireless communication technology that is used for the implementations described herein can be based on various factors that can include battery life, data usage, security and/or line-of-sight restrictions, and other concerns. In some embodiments, ZigBee or Bluetooth wireless communications may be used in applications where link security is prioritized. In other embodiments where frequency interference is a concern, Bluetooth or UWB communications may be used since both technologies use adaptive frequency hopping to avoid channel collision. In embodiments where a total of frequency channels is prioritized, Bluetooth wireless communications may be used.

In some examples, the acceleration sensor and drive circuitry 250 for a particular seat 100 or set of seats may include back-up acceleration and/or drive circuitry that may be used to cause actuation of the actuator 220 in situations of malfunction or failure of primary acceleration sensor and drive circuitry 250 for the seat 100 or set of seats. In some implementations, the primary acceleration sensor and drive circuitry 250 and/or the actuator 220 that detects that the acceleration sensor and drive circuitry 250 has failed can output an activation signal to back-up acceleration sensor and drive circuitry to configure the back-up acceleration sensor and drive circuitry as the primary acceleration sensor and drive circuitry 250 for the seat or seat 100 or set of seats.

Figure 4:
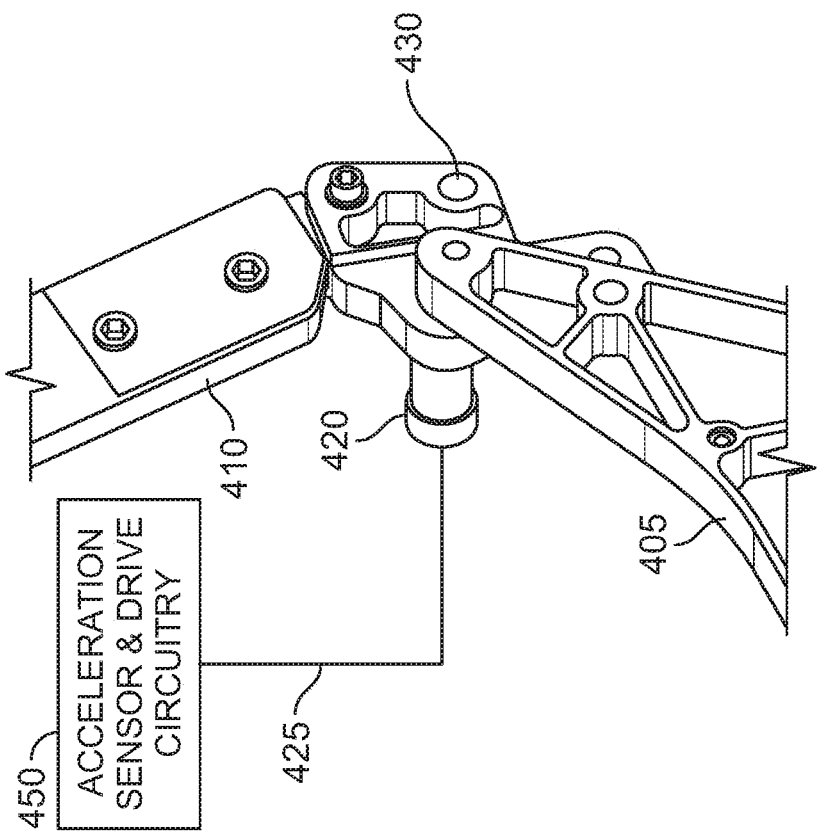
FIG. 4 illustrates another outside view of the hinge area of an aircraft passenger seat after a high G-force event according to some embodiments of the present disclosure.
Figure 3:
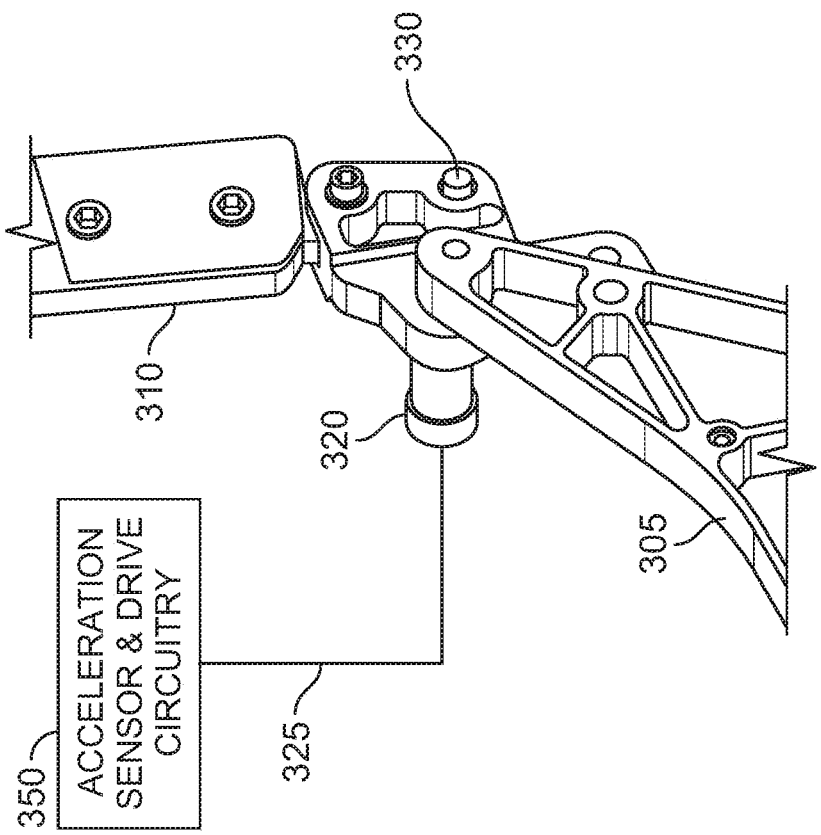
FIG. 3 illustrates an outside view of the hinge area of an aircraft passenger seat with the seat back in the full upright position according to some embodiments of the present disclosure.

Referring to FIGS. 3 and 4, outside views of the hinge area (shown as dotted area 115 in FIG. 1) of an aircraft passenger seat according to some embodiments of the present disclosure are illustrated. In FIG. 3, under normal operating conditions, a shaft 330 may limit the forward travel of a seat back element 310 with respect to a seat bottom frame element 305. In some embodiments, the normal (in-service) limit on the forward travel of the seat back element 310 may be defined as the full upright position of the seat back. FIG. 3 also shows the positions of the seat bottom frame element 305, an actuator 320, and a cable 325 in the normal in-service upright positions. Acceleration sensor and drive circuitry 350 may be connected to the cable 325 and provide an actuation function in case of a high G-force event to cause retraction of the shaft 330 from a recess 430 (FIG. 4) that keeps the seat back element 310 from moving forward past the full upright (TTOL) position during normal operations. In some implementations, the actuation function performed by the actuator 320 in response to receiving a control signal from the acceleration sensor and drive circuitry 350 may include overcoming a spring force to uncouple the shaft 330 from the recess 430.

FIG. 4 illustrates an exemplary situation after, for example, a high G-force event. In FIG. 4, the acceleration sensor and drive circuitry 450 may have provided a drive signal to the actuator 420, which may have allowed the seat back element 410 to move forward with respect to the seat bottom frame element 405 after the actuator 420 has retracted the shaft (shown as the shaft 330 in FIG. 3, and as the recess 430 in FIG. 4) that normally keeps the seat back element 410 from moving forward past the full upright position.

Figure 5B:
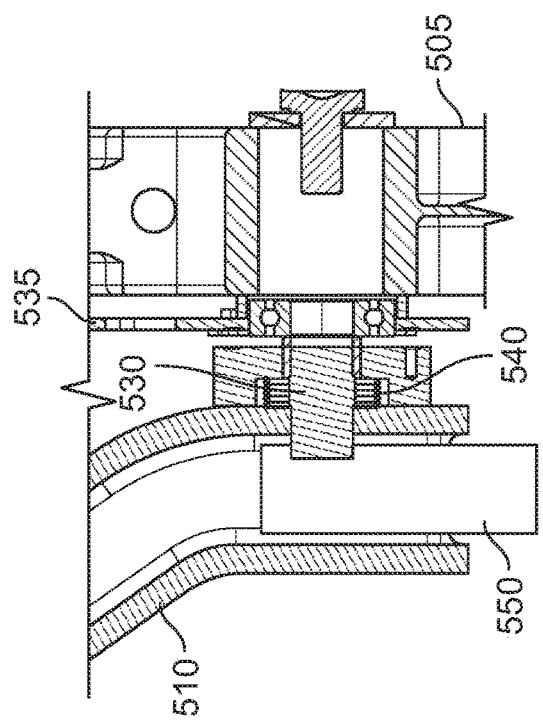
FIGS. 5A-5C illustrate views of the hinge area of an aircraft passenger seat according to another embodiment of the present disclosure.
Figure 5C:
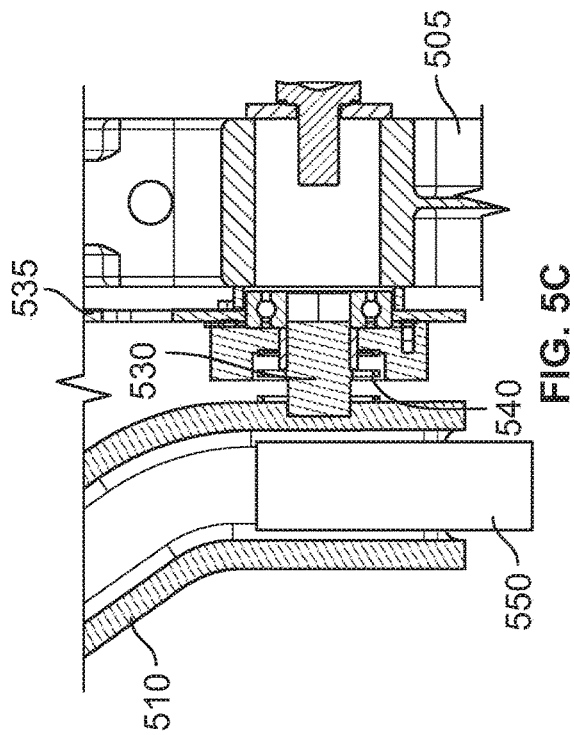
Figure 5A:
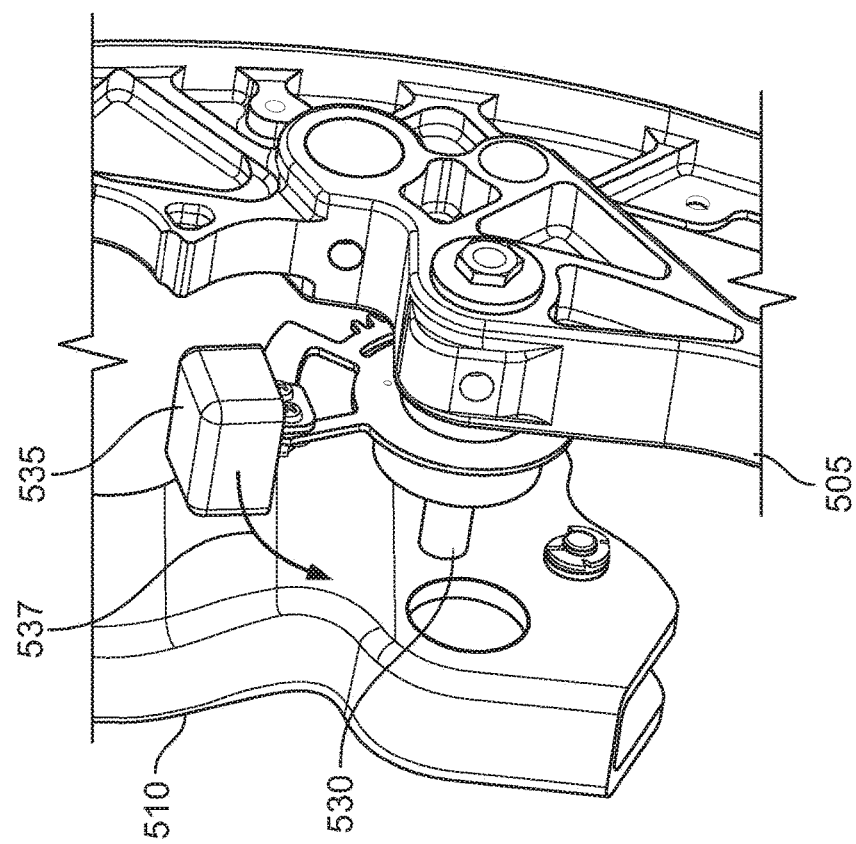

FIGS. 5A, 5B and 5C illustrate various views of the hinge area (shown as dotted area 115 in FIG. 1) of an aircraft passenger seat according to another embodiment of the present disclosure. FIG. 5A illustrates a partially exploded view of the hinge area, including a seat bottom frame element 505, a seat back element 510, a shaft 530, and an inertial release assembly 535. In some embodiments, the inertial release assembly 535 is affixed at a rear end of the shaft 530 adjacent to the seat bottom frame element 505 and may rotate forward (in the direction of arrow 537) during a high G-force event causing the shaft 530 to retract from the seat back element 510, thereby allowing forward rotation of the seat back element 510 forward of the full upright (TTOL) position. FIG. 5B illustrates a cross-sectional view of the hinge area where, under normal operating conditions, the shaft 530 is inserted into a recess in the seatback element 510 and may limit the forward travel of seat back element 510 with respect to seat bottom frame element 505. In some embodiments, the normal (in-service) limit on the forward travel of the seat back element 510 may be defined as the full upright TTOL position of the seat back.

FIG. 5C illustrates another cross-sectional view of an exemplary situation after, for example, a high G-force event. In some implementations, the inertial release assembly 535 includes a weighted end that may remain static during normal operations but may rotate in a forward direction 537 during a high G-force event. The rotation of the inertial release assembly 535 pulls or retracts the shaft 530 from the recess in the seat back element 510 with the assistance of a spring 540 that expands along a length of the shaft 530 as the inertial release assembly 535 retracts the shaft 530 from the recess. As shown in FIG. 5C, a high G-force event may cause the seat back element 510 to move forward with respect to the seat bottom frame element 505 after the inertial release assembly 535 has rotated and allowed the spring 540 to expand from its compressed state (shown in FIG. 5B) to cause retraction of the shaft 530. A speed of activation of the inertial release assembly 535 may be tunable in order to optimize a velocity differential between a portion of the seatback proximate a head of the passenger and a portion of the seat back proximate a lower back of the passenger.

Figure 6B:
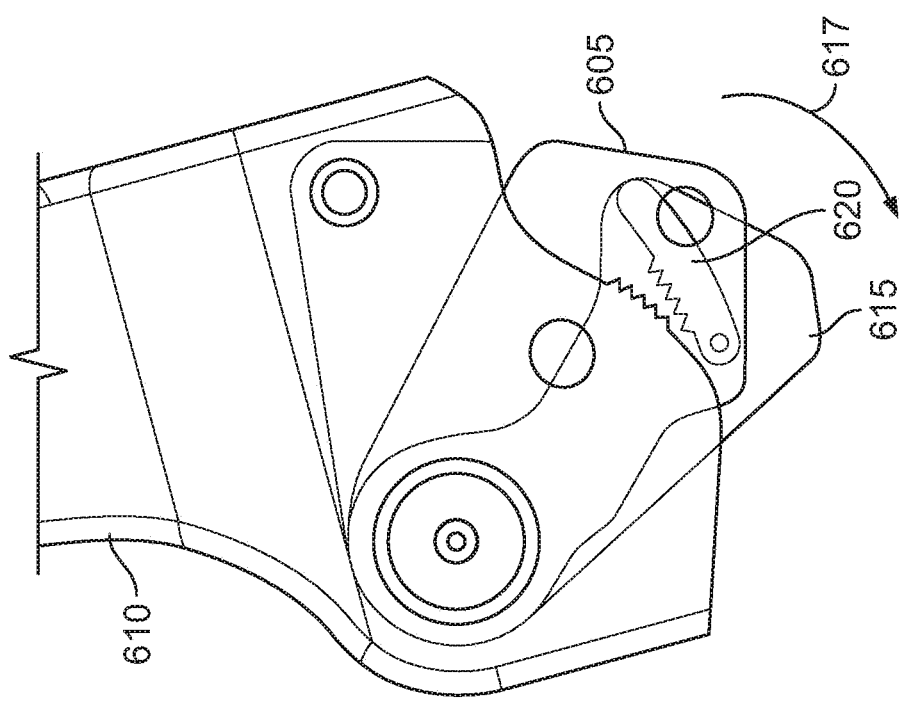
FIGS. 6A and 6B illustrate views of the hinge area of an aircraft passenger seat according to yet another embodiment of the present disclosure.
Figure 6A:
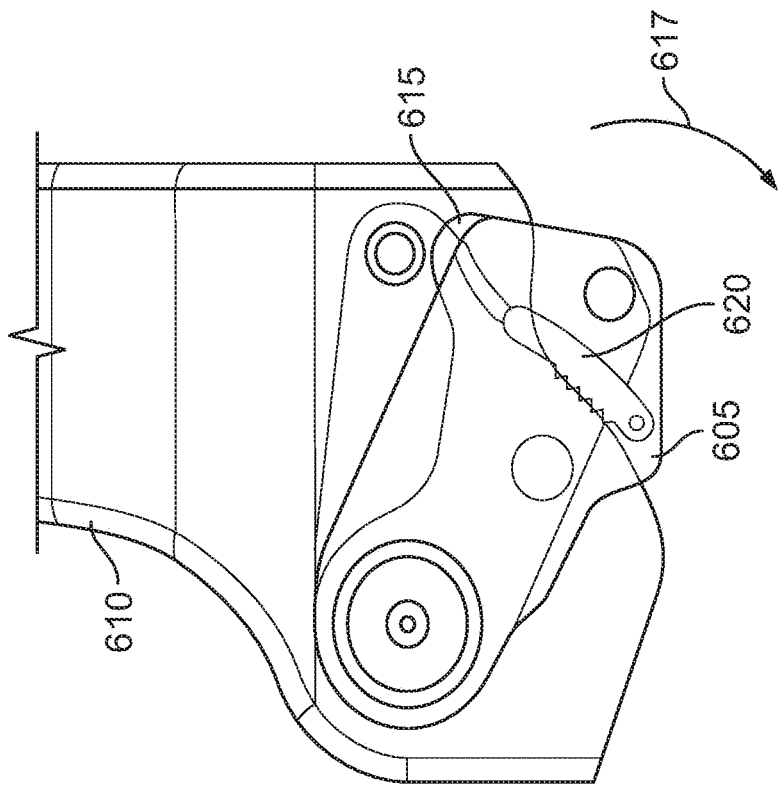

FIGS. 6A and 6B illustrate views of the hinge area (shown as dotted area 115 in FIG. 1) of an aircraft passenger seat according to yet another embodiment of the present disclosure. FIG. 6A illustrates a view of the hinge area where the seat back is in the full upright TTOL position, including a component of a seat bottom frame element 605, a seat back element 610, an inertial link 615, and a gear latch 620. In some embodiments, under normal conditions, a gear feature on the gear latch 620 meshes with a complementary gear feature on the seat back element 610, keeping the seat back from folding forward of the full upright position. FIG. 6B illustrates how, in some embodiments, the inertial link 615 may rotate forward (in the direction of arrow 617) during a high G-force event. As the inertia link 615 rotates, a shaft in the gear latch 620 may follow a slot in the inertia link 615, which may, in turn, disengage the gear feature the in gear latch 620 from the complementary gear feature in the seat back element 610 and allow the seat back to tilt forward of the full upright position.

Figure 7:
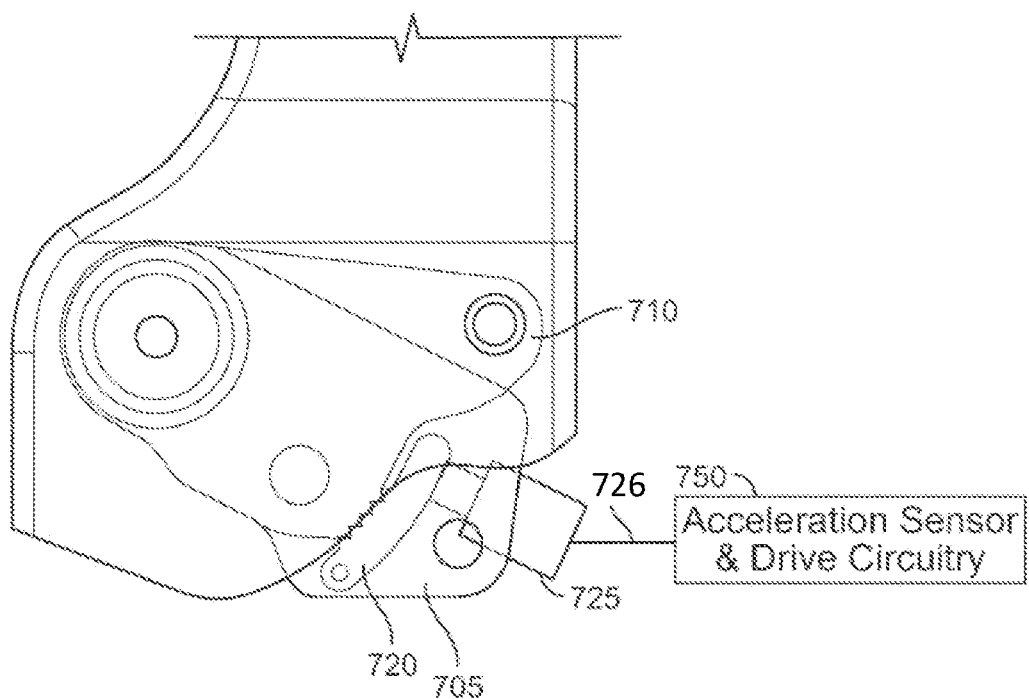
FIG. 7 illustrates a view of the hinge area of an aircraft passenger seat according to yet another embodiment of the present disclosure.

FIG. 7 illustrates a view of the hinge area (shown as dotted area 115 in FIG. 1) of an aircraft passenger seat according to yet another embodiment of the present disclosure. In FIG. 7 the hinge area may include a component of a seat bottom frame element 705, a seat back element 710, a gear latch 720 and a solenoid 725. In some embodiments, the solenoid 725 may be actuated by acceleration sensor and drive circuitry 750, through a cable 726, during a high G-force event to pull the gear latch 720 which may, in turn, disengage a gear feature in the gear latch 720 from a complementary gear feature in the seat back element 710 and allow the seat back to tilt forward beyond the full upright position. A speed of deployment of the solenoid 725 is tunable in order to optimize a velocity differential between a portion of the seatback proximate a head of the passenger and a portion of the seat back proximate a lower back of the passenger.

FIGS. 8A-8E, 9A and 9B illustrate various views of the hinge area (shown as dotted area 115 in FIG. 1) and breakover mechanism of an aircraft passenger seat according to yet another embodiment of the present disclosure. In this embodiment, the breakover mechanism may include a shaft 805, a collar 810, a spring mechanism 815 (e.g., spring, rubber bearing, etc.) and one or more balls 825. In some embodiments, the collar 810 may be attached to a seat back 820. Under normal operating conditions, as illustrated in FIG. 8A, the shaft 805 may be held in place within a recess 902 (FIGS. 9A-9B) in the seat back 820 such that a shaft end portion 808 extends past an outer surface of the seat back 820. In some examples, the shaft 805 may be held in place by an inertial release mechanism, solenoid, and/or actuator with associated acceleration sensor and drive circuitry. In addition, during normal operation conditions, the spring mechanism 815 may be in a compressed state.

FIG. 8C illustrates the shaft 805 and the one or more balls 825, with the collar 810 removed for clarity. As shown in FIGS. 8A and 8C, the shaft 805 may include a rod 806, a ball entrapment element 807, a shaft end portion 808 and a shoulder 809, which all move together when the breakover mechanism is activated. Under normal operating conditions, the ball entrapment element 807 of the shaft 805 holds the one or more balls 825 within channels 827 formed in the outer rim of the ball entrapment element 807. FIG. 8D illustrates a cross-sectional view of a portion of the collar 810 and shows the one or more balls 825 trapped within the recesses 828 in the collar 810. The channels 827 on the outer rim of the ball entrapment element 807 and the recesses 828 in the collar 810 hold the one or more balls 825 in place and prevent linear and axial movement of the one or more balls 825 and prevent the shaft 805 from rotating within the collar 810. This may prevent the passenger seat from moving forward past the full upright position. In some implementations, the shaft 805 and the collar 810 may be coaxial with one another and rotationally locked with the ball entrapment element 807. The shaft 805 may be attached to the frame of the seat back 820 and can move axially but is locked radially, while the collar 810 is attached to the seat back 820. When the shaft 805 is moved axially, the lock may be disengaged and the collar 810 can rotate freely around the shaft 805.

FIGS. 8B and 8E illustrate the situation where the breakover mechanism has been "activated" in response to a high G-force event by, for example, an inertial release assembly, solenoid, and/or actuator with associated acceleration sensor and drive circuitry. In the activated state, the shaft 805 is pushed to the left (as illustrated in FIG. 8B) as the spring 815 expands between the shoulder 809 and the collar 810 such that the shaft end portion 808 is withdrawn from the recess 902 in the seat back 820. The one or more balls 825 may fall into a recess in the shaft 805, allowing for the shaft 805 to rotate freely within the collar 810. When this occurs, there may be a rotational freedom of movement between the collar 810 and the shaft 805, which may allow for the seat back 820 to tilt forward of the full upright position.

Figure 9B:
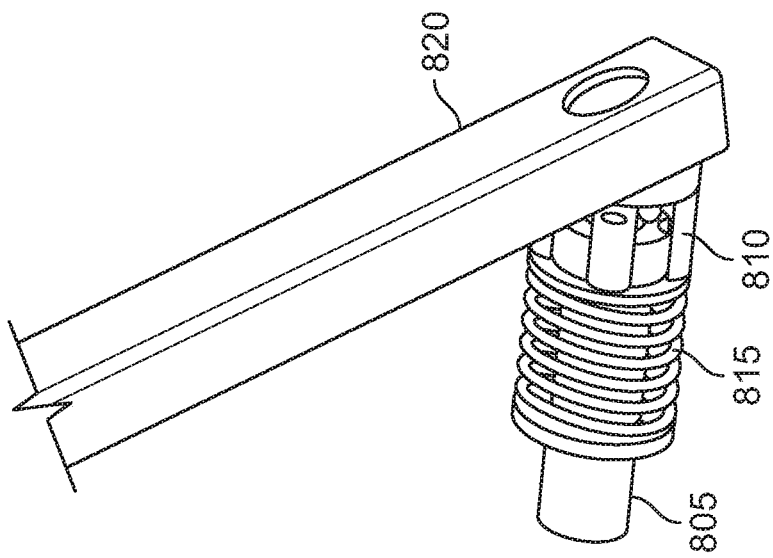
FIGS. 9A and 9B illustrate expanded perspective views of the hinge area and breakover mechanism of an aircraft passenger seat according to some embodiments of the present disclosure.
Figure 9A:
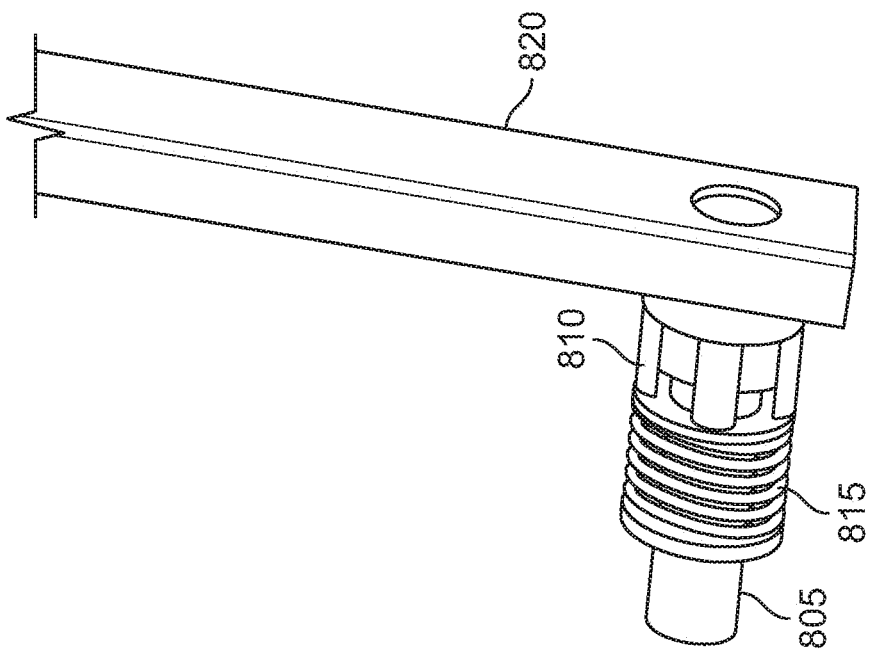

FIGS. 9A and 9B illustrate a slightly expanded perspective view of the embodiments shown in FIGS. 8A and 8B, respectively. For example, FIG. 9A illustrates an implementation of the seat back 820 during normal operating conditions when the shaft 805 may be held in place within the recess 902 in the seat back 820 such that the shaft end portion 808 extends past an outer surface of the seat back 820, which may prevent the seat back 820 from rotating forward past the full, upright (TTOL) position. In addition, during normal operation conditions, the spring 815 may be in a compressed state. When the breakover mechanism is activated during a high G-force event, the shaft 805 is pushed to the left (as illustrated in FIG. 9B) as the spring 815 expands between the shoulder 809 and the collar 810 such that the shaft end portion 808 is withdrawn from the recess 902 in the seat back 820. The one or more balls 825 may fall into a recess in the shaft 805, allowing for the shaft 805 to rotate freely within the collar 810. When this occurs, there may be a rotational freedom of movement between the collar 810 and the shaft 805, which may allow for the seat back 820 to tilt forward of the full upright position.

Figure 10A:
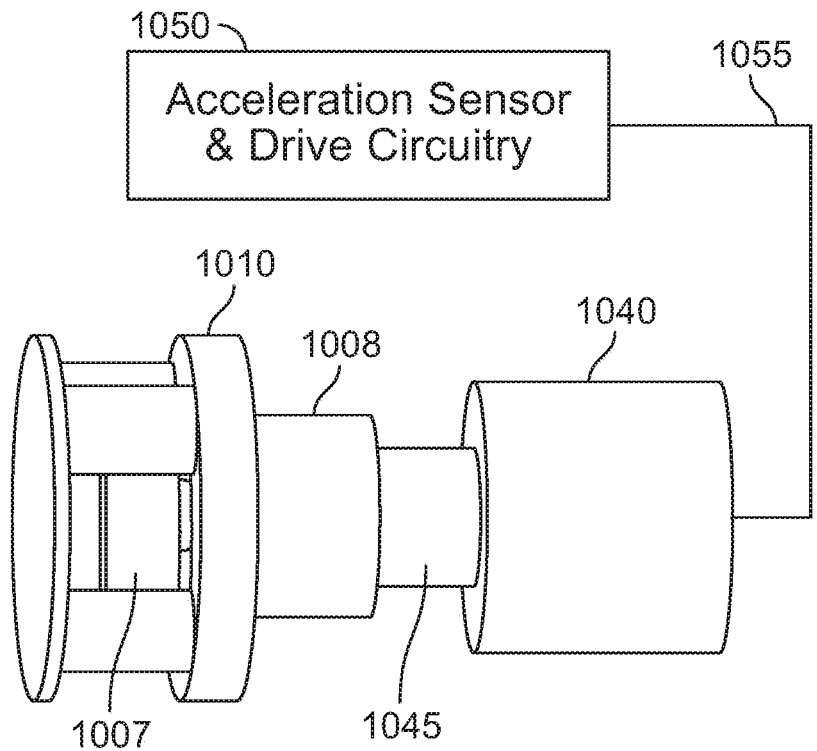
FIGS. 10A and 10B illustrate views of a breakover mechanism of an aircraft passenger seat according to some embodiments of the present disclosure.
Figure 10B:
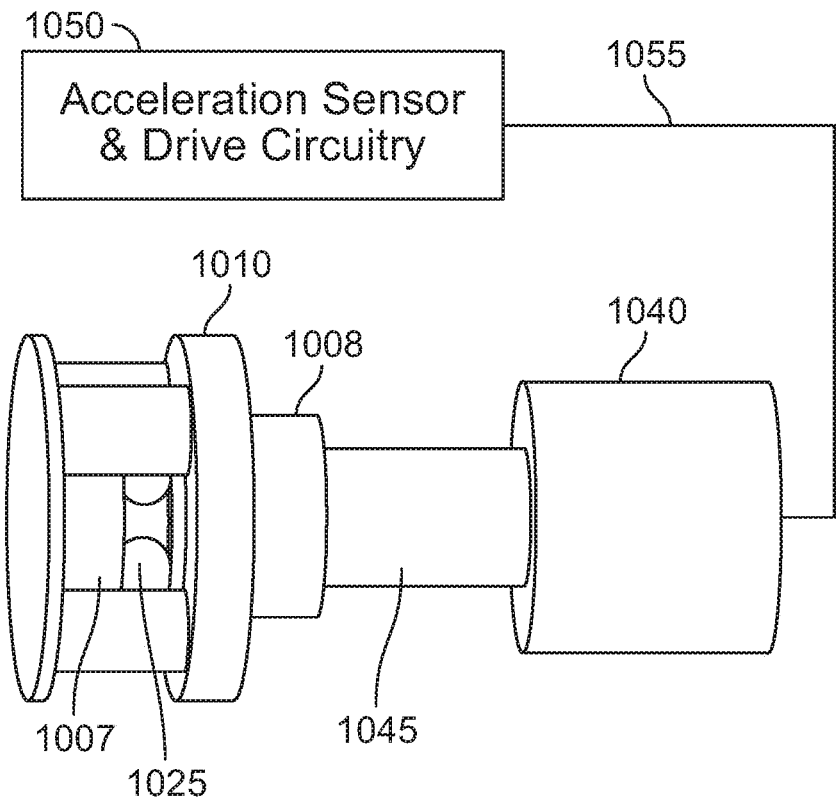

FIGS. 10A and 10B illustrate views of a breakover mechanism of an aircraft passenger seat according to embodiments illustrated in FIGS. 8A-8E, 9A and 9B. In these illustrations, the breakover mechanism may include a ball entrapment element 1007, a shaft 1008, a collar 1010, one or more balls 1025, a solenoid 1040, and a solenoid shaft 1045. FIG. 10B illustrates the situation where, for example, during a high G-force event, the breakover mechanism has been "activated" by acceleration sensor and drive circuitry 1050 energizing the solenoid 1040 through a cable 1055, which may drive the solenoid shaft 1045 to the left. The acceleration sensor and drive circuitry 1050 may, in some embodiments, be centrally located and provide the drive current for multiple solenoids. In other embodiments, the acceleration sensor and drive circuitry 1050 may be located in or near a particular seat (or group of seats). In such embodiments, the acceleration sensor and drive circuitry 1050 may provide the drive current for one or a few actuators. In some embodiments, when the solenoid 1040 drives the solenoid shaft 1045 to the left, the one or more balls 1025 may fall into a recess in the shaft 1008, allowing the shaft 1008 to rotate freely within the collar 1010. When this occurs, there may be a rotational freedom of movement between the collar 1010 and the shaft 1008, and this may allow for the seat back to tilt forward beyond the full upright position.

Figure 11B:
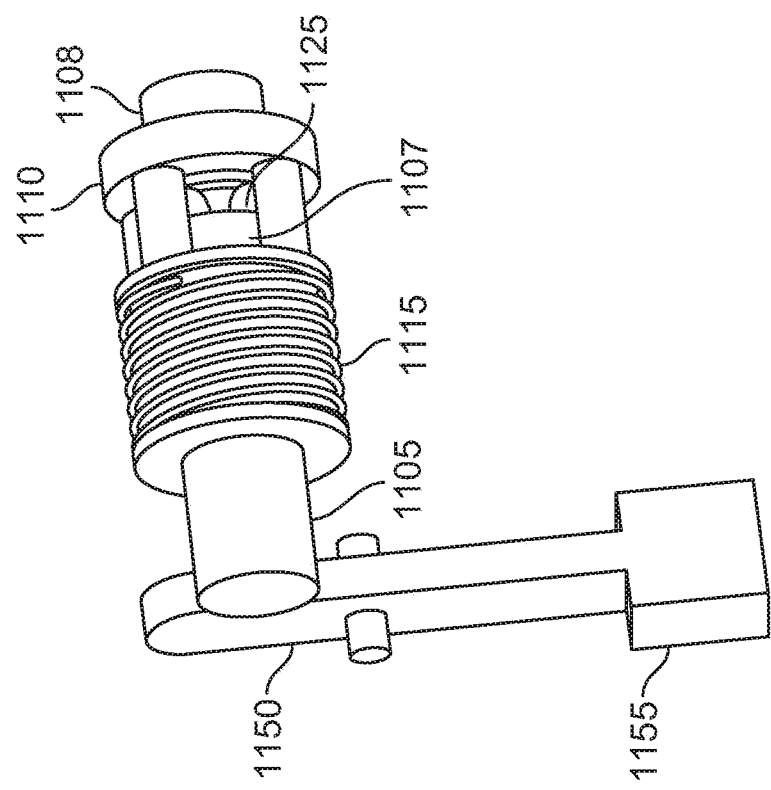
FIGS. 11A and 11B illustrate views of another breakover mechanism of an aircraft passenger seat according to some embodiments of the present disclosure.
Figure 11A:
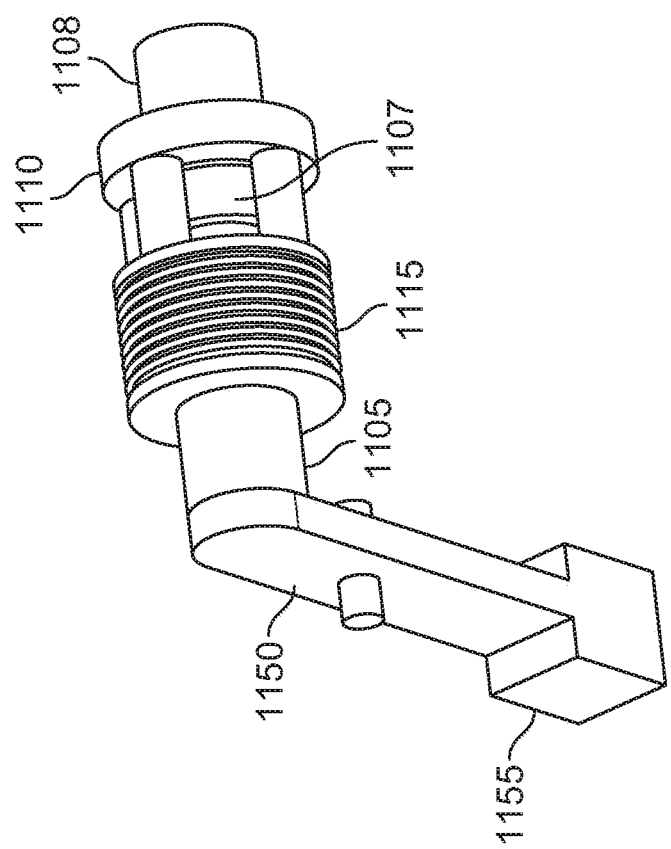

FIGS. 11A and 11B illustrate views of a breakover mechanism of an aircraft passenger seat according to embodiments illustrated in FIGS. 8A-8E, 9A and 9B. In these illustrations, the breakover mechanism may include a shaft 1105 (including a ball entrapment element 1107 and a shaft 1108), a collar 1110, a spring 1115, one or more balls 1125 and an inertial lever 1150. Under normal operating conditions, as illustrated in FIG. 11A, the shaft 1105 may be held in place by the inertial lever 1150, and the spring 1115 may be in a compressed state. FIG. 11B illustrates the situation where the breakover mechanism has been "activated" by the movement of the inertial lever 1150 in response to a high G-force event. In some embodiments, a weighted end 1155 of the inertial lever 1150 may cause the inertial lever 1150 to rotate and move in such a manner that the shaft 1105 may move to the left, whereupon the one or more balls 1125 may fall into a recess in the shaft 1105, allowing for the shaft 1105 to rotate freely within the collar 1110. When this occurs, there may be a rotational freedom of movement between the collar 1110 and the shaft 1105, and this may allow for the seat back to tilt forward beyond the full upright position.

Figure 12:
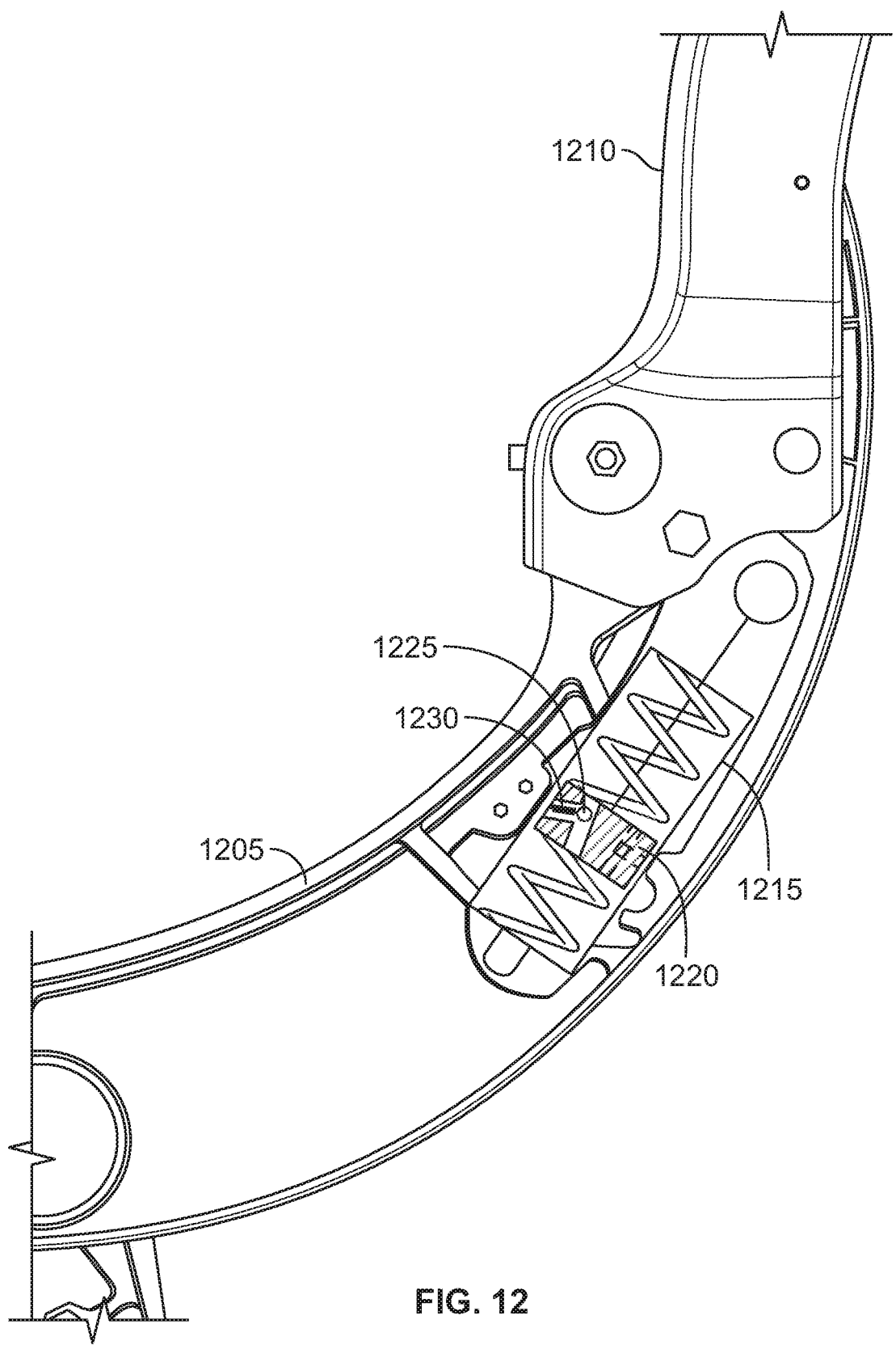
FIG. 12 illustrates a view of the hinge area and breakover mechanism of an aircraft passenger seat according to yet another embodiment of the present disclosure.

FIG. 12 illustrates a view of the hinge area (shown as dotted area 115 in FIG. 1) and breakover mechanism of an aircraft passenger seat according to yet another embodiment of the present disclosure. In some embodiments, the breakover mechanism may be incorporated into, or associated with, a traditional seat recline mechanism. Referring to FIG. 12, under normal operating conditions, a recline lock cylinder 1215 may allow for rearward movement of a seat back element 1210 (reclining) under the control of a seated passenger, but limit the forward travel of the seat back element 1210 with respect to a seat bottom frame element 1205. In some embodiments, the normal (in-service) limit on the forward travel of the seat back element 1210 may be defined as the full upright TTOL position of the seat back element 1210. The recline lock cylinder 1215 may include a piston 1220, a ball check 1225, and a spring 1230. Additional elements, not shown in FIG. 12, may be provided within the recline lock cylinder 1215 to facilitate normal recline functionality. In some embodiments, the recline lock cylinder 1215 may be filled with a gas, while in other embodiments, the recline lock cylinder 1215 may be filled with a fluid (e.g., a hydraulic fluid). In some embodiments, in response to a high G-force event, a ball 1225 may move forward (toward the left in FIG. 12), compressing the spring 1230, and allowing fluid (or gas) to pass through the piston 1220 which, in turn, may allow the seat back to move forward beyond the full upright (TTOL) position. The ball 1225 may be oriented perpendicular to seat back loads and may therefore be decoupled from typical loads (normal passenger movement). In some embodiments, the breakover mechanism may be embodied separately from the recline lock cylinder 1215 (e.g., a separate cylinder). The ball 1225 may, in some embodiments, be mounted separately from the recline lock cylinder 1215 to allow independent orientation of the ball 1225 and the spring 1230 from the recline lock cylinder 1215.

Figure 13B:
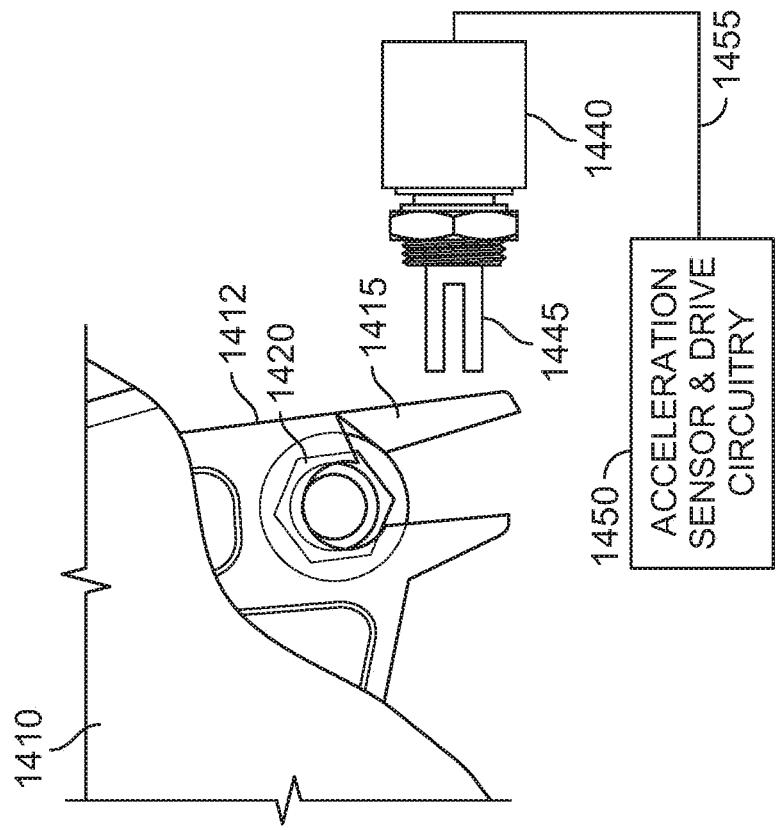
FIGS. 13A and 13B illustrate views of a breakover mechanism of an aircraft passenger seat according to some embodiments of the present disclosure.
Figure 13A:
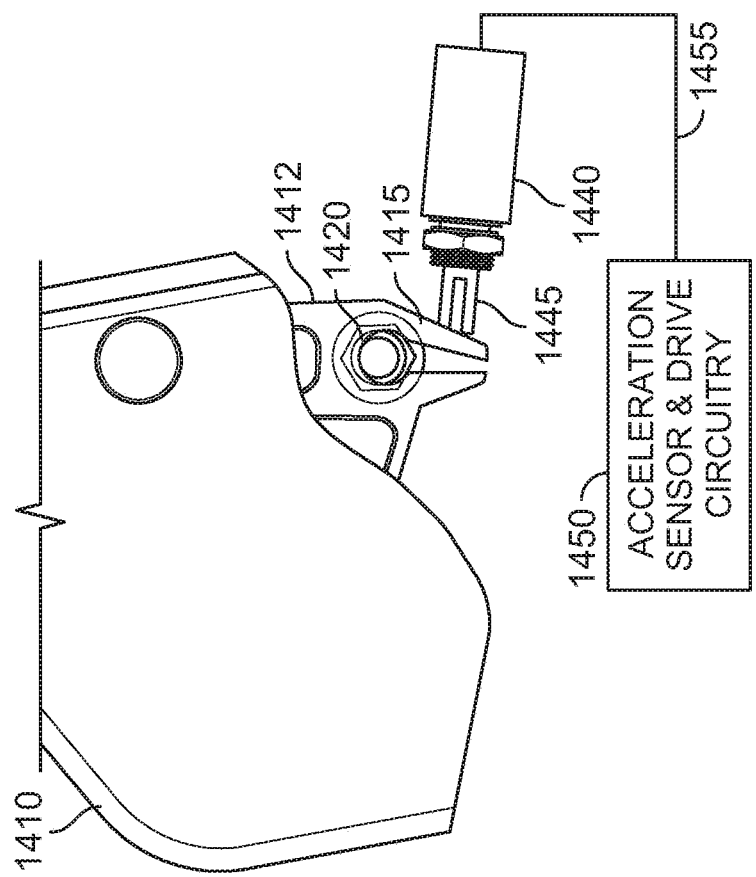

FIGS. 13A and 13B again illustrate a view of the hinge area (shown as dotted area 115 in FIG. 1) and breakover mechanism of an aircraft passenger seat. In FIG. 13A, a bracket 1412 may be fixedly attached to a seat back element 1410. The bracket 1412 may also be pivotably attached to a recline lock cylinder (not shown) by way of a fastener 1420. The recline lock cylinder may provide for normal rearward recline functionality of the passenger seat. In some embodiments, the bracket 1412 may also include a clothespin feature 1415 that may allow, under some circumstances, for the fastener 1420 (and the recline lock cylinder) to detach from the bracket 1412, allowing the seat back to tilt forward of the full upright (TTOL) position. In some embodiments, a solenoid 1440 and solenoid shaft 1445 may be positioned and configured to provide for activation of the breakover mechanism. For example, the right element of clothespin feature 1415 may be hingedly connected to the bracket 1412. Under normal conditions, the solenoid 1440 and solenoid shaft 1445 may hold the clothespin feature 1415 together, preventing the fastener 1420 from detaching from the bracket 1412. During a high G-force event, in some embodiments, an acceleration sensor and drive circuitry 1450 may provide a drive current through a cable 1455 to the solenoid 1440, which may act to retract the solenoid shaft 1445, and thereby allow the clothespin feature 1415 to open (as shown in FIG. 13B). Once the clothespin feature 1415 has opened, the fastener 1420 (and the recline lock cylinder) may detach from the bracket 1412, allowing the seat back to tilt forward of the full upright (TTOL) position.

Figure 14:
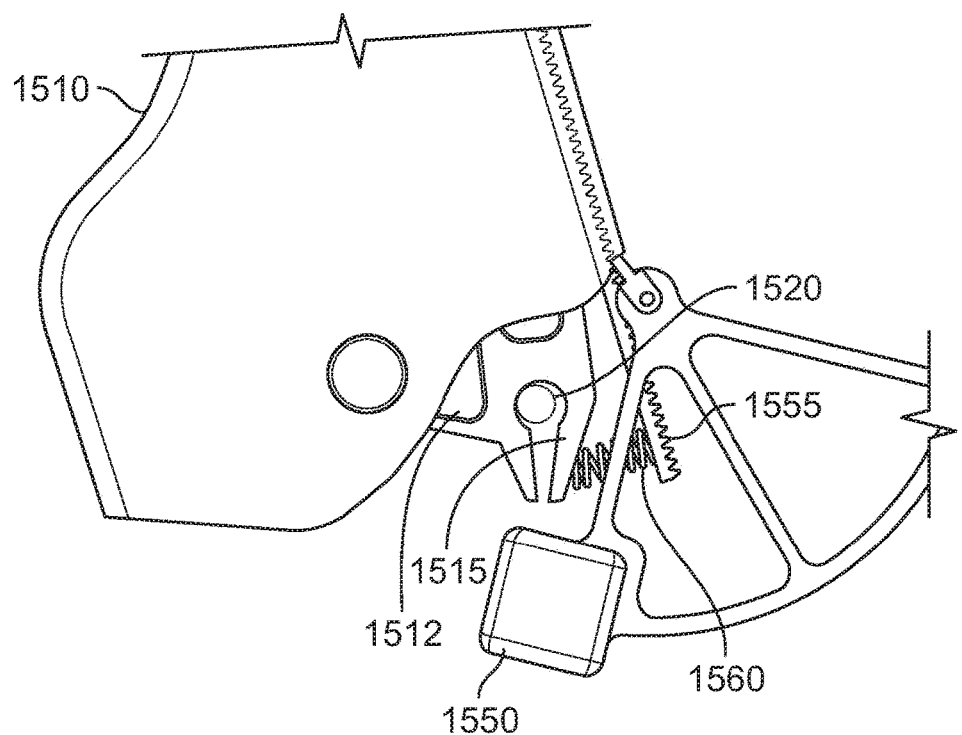
FIG. 14 illustrates an alternative actuation mechanism for some embodiments of the present disclosure.

FIG. 14 illustrates an alternative actuation mechanism for the embodiments illustrated in FIGS. 13A and 13B. In FIG. 14, a bracket 1512 may be fixedly attached to a seat back element 1510. The bracket 1512 may also be pivotably attached to a recline lock cylinder (not shown) by way of a fastener 1520. In some embodiments, the bracket 1512 may also include a clothespin feature 1515 that may allow, under some circumstances, for the fastener 1520 and the recline lock cylinder to detach from the bracket 1512, allowing the seat back to tilt forward of the full upright (TTOL) position. In some embodiments, a weighted inertial release 1550 may be employed with the open clothespin feature 1515. For example, the weighted inertial release 1550 may pivot forward (clockwise in FIG. 14) during a high G-force event, releasing a spring 1560 that, under normal circumstances, holds the clothespin feature 1515 closed.

Figure 15A:
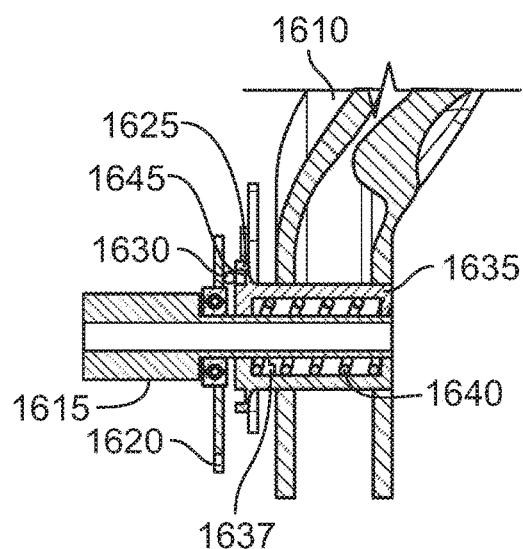
FIGS. 15A and 15B illustrate views of the hinge area and breakover mechanism of an aircraft passenger seat according to yet another embodiment of the present disclosure.
Figure 15B:
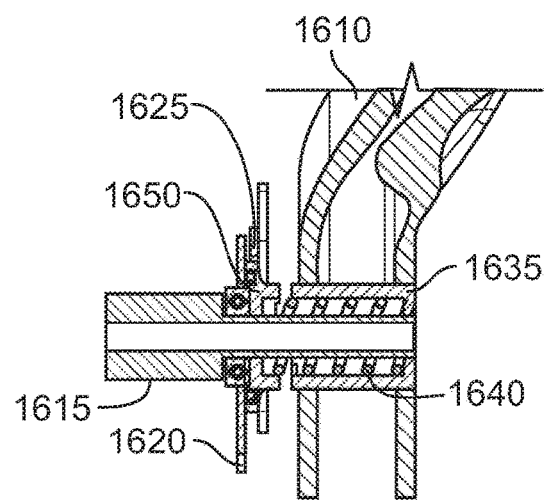

FIGS. 15A and 15B illustrate views of the hinge area (shown as dotted area 115 in FIG. 1) and breakover mechanism of an aircraft passenger seat according to yet another embodiment of the present disclosure. This embodiment may include a seat back element 1610, a shaft 1615, a trigger ring 1620, a gear ring 1625, one or more balls 1630, a gear bushing 1635, and a spring 1640. In some embodiments, the seat back element 1610 may be fixedly attached to the gear bushing 1635. Under normal operating conditions (FIG. 15A), the gear ring 1625 and gear bushing 1635 are in a locked condition (gear teeth 1637 are meshed). In a high G-force event, acceleration may cause the lower portion of the trigger ring 1620 to swing forward as illustrated in FIG. 15B. This may cause the one or more balls 1630 to roll into pockets 1645 in the gear ring 1625 (illustrated as ball in pocket 1650 in FIG. 15B) as a result of the force applied by the spring 1640. This may collapse the space between the gear ring 1625 and the trigger ring 1620 as illustrated in FIG. 16B, disengaging the teeth between the gear ring 1625 and the gear bushing 1635. When this occurs, there may be a rotational freedom of movement of the seat back element 1610, and this may allow for the seat back to tilt forward beyond the full upright (TTOL) position.

FIGS. 16A, 16B and 16C illustrate an exemplary implementation of a breakover actuation mechanism for the embodiments illustrated in FIGS. 15A and 15B. FIGS. 16A, 16B and 16C each show a seat back element 1710, a shaft 1715, a trigger ring 1720, acceleration sensor and drive circuitry 1750, a cable 1755, a solenoid 1760, and a solenoid shaft 1765. Some components of the embodiments illustrated in FIGS. 15A and 15B are not shown for clarity. Under normal operating conditions (FIG. 16B), the trigger ring 1720 may be held in a position by the solenoid 1760 and solenoid shaft 1765. This may limit the forward rotation of the seat back element 1710 past the full upright (TTOL) position. In a high G-force event, the acceleration sensor and drive circuitry 1750 may provide a drive current, through the cable 1755, to the solenoid 1760, which may act to extend the solenoid shaft 1765, and thereby rotate the trigger ring 1720 in a clockwise direction. When this occurs, there may be a rotational freedom of movement of the seat back element 1710, and this may allow for the seat back to tilt forward beyond the full upright (TTOL) position.

Figure 17C:
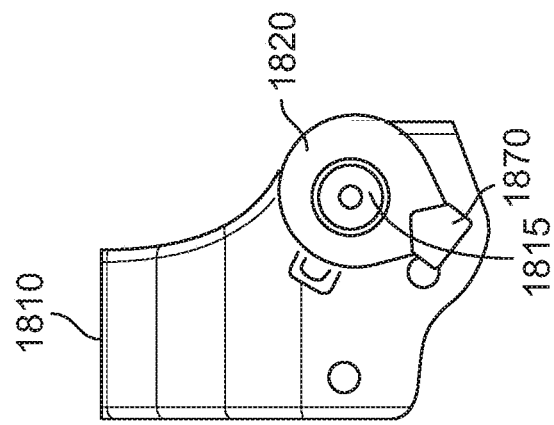
FIGS. 17A-17C illustrate another exemplary implementation of a breakover actuation mechanism for some embodiments of the present disclosure.
Figure 17B:
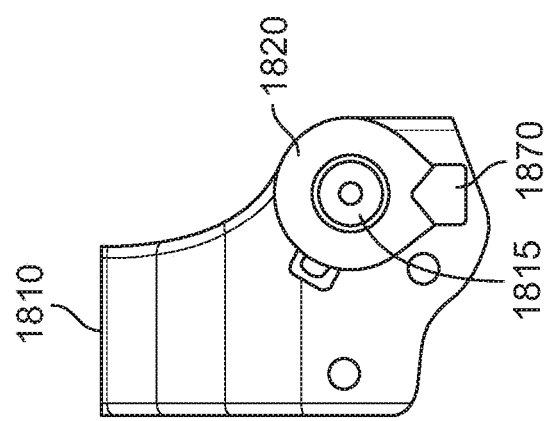
Figure 17A:
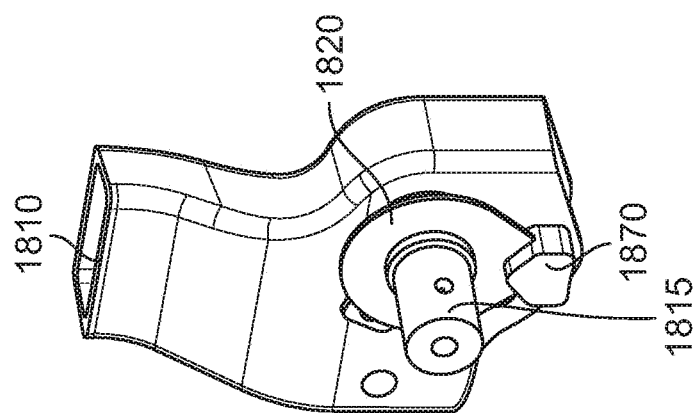

FIGS. 17A, 17B and 17C illustrate another exemplary implementation of a breakover actuation mechanism for the embodiments illustrated in FIGS. 15A and 15B. FIGS. 17A, 17B and 17C each show a seat back element 1810, a shaft 1815, a trigger ring 1820 and a weighted element 1870. In some embodiments, the weighted element 1870 is fixedly attached to the trigger ring 1820. Some components of the embodiments illustrated in FIGS. 15A and 15B are not shown for clarity. Under normal operating conditions (FIG. 17B), the trigger ring 1820 may be held in a position by the weighted element 1870. This may limit the rotation of the seat back element 1810 past the full upright (TTOL) position. In a high G-force event, forward movement of the weighted element 1870 may cause rotation of the trigger ring 1820 in a clockwise direction. When this occurs, there may be a rotational freedom of movement of the seat back element 1810, which may allow for the seat back to tilt forward beyond the full upright (TTOL) position.

Figure 17D:
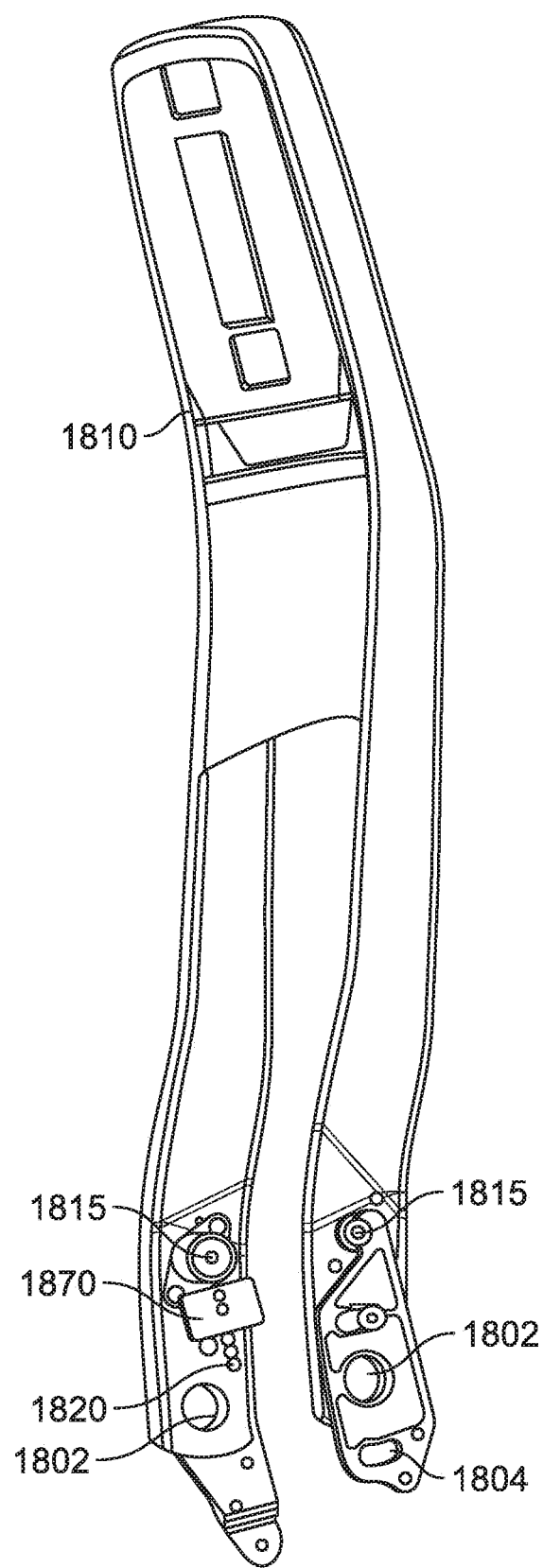
FIG. 17D illustrates a perspective view of a seat back element including the breakover actuation mechanism described in FIGS. 17A-17C.

FIG. 17D illustrates a perspective view of a seat back element 1810 including the breakover actuation mechanism described above in FIGS. 17A-17C including the shaft 1815, the trigger ring 1820 and the weighted element 1870. For example, FIG. 17D illustrates a front view the seat back element 1810 that show components of the breakover mechanism and hinge area on both sides of the seat back element 1810 where the seat back element 1810 connects to a seat bottom element, such as seat bottom frame element 105 (FIG. 1). In some implementations, the seat back element 1810 connects to the seat bottom frame element at one or more connection locations such as a pivot link 1802 and slot 1804 having complementary features with connection locations on the seat bottom frame element. In some implementations, the weighted element 1870 rotates in response to a high G-force event, which may cause rotation of the trigger ring 1820. As discussed above, rotation of the trigger ring 1820 may cause rotational freedom of movement of the seat back element 1810, which may allow for the seat back element 1810 to tilt forward beyond the full upright (TTOL) position.

Figure 18C:
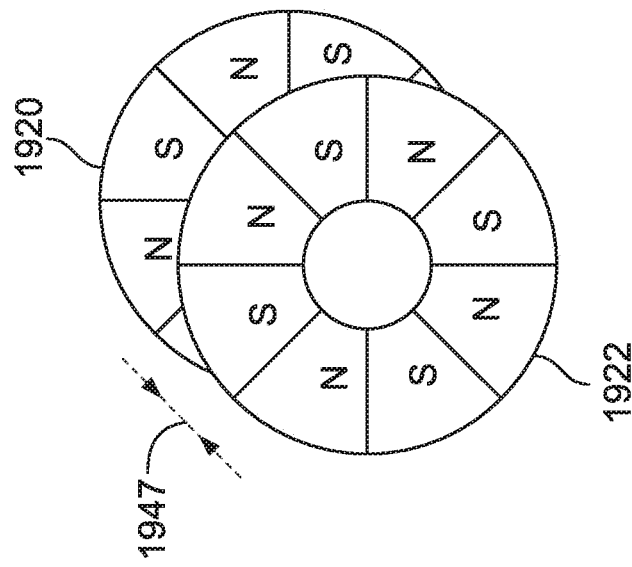
FIGS. 18A-18C illustrate yet another exemplary implementation of a breakover actuation mechanism for some embodiments of the present disclosure.
Figure 18B:
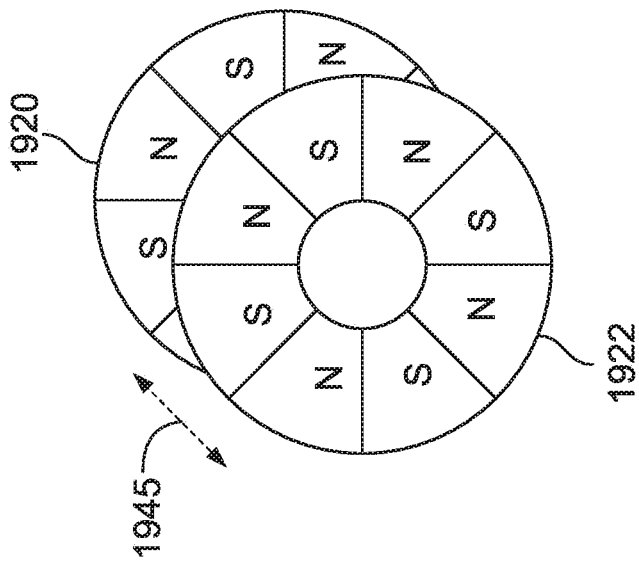
Figure 18A:
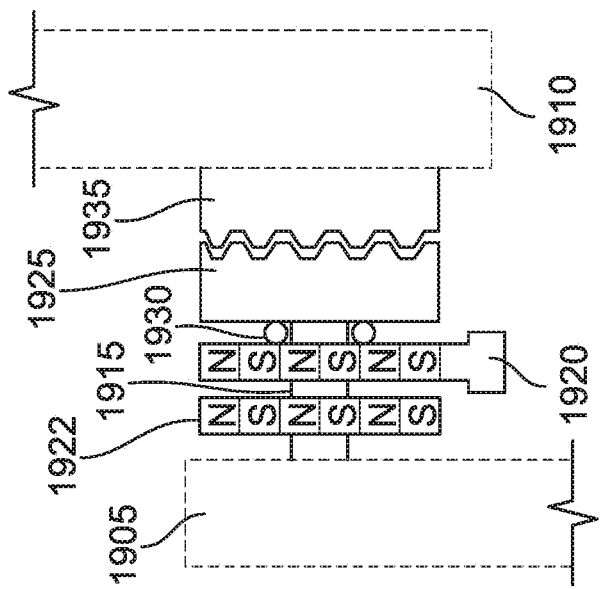

FIGS. 18A, 18B and 18C illustrate another exemplary implementation of a breakover actuation mechanism for the embodiments illustrated in FIGS. 15A and 15B. FIGS. 18A, 18B and 18C each show a seat back element 1910, a seat bottom frame element 1905, a shaft 1915, a weighted magnetic trigger ring 1920, a magnetic ring 1922, a gear ring 1925, one or more balls 1930, and a gear bushing 1935. In some embodiments, the weighted magnetic trigger ring 1920 and the magnetic ring 1922 each have an even number of alternating wedge-shaped magnetic domains of alternating polarity. In FIGS. 18B and 18C, the weighted magnetic trigger ring 1920 and the magnetic ring 1922 each have eight wedge-shaped magnetic domains, but the number of wedge-shaped magnetic domains may be more or less than eight (e.g., any even number of domains). Some components of the embodiments illustrated in FIGS. 15A and 15B are not shown for clarity. Under normal operating conditions (FIG. 18B), the weighted magnetic trigger ring 1920 is held in a position such that the magnetic domains of the weighted magnetic trigger ring 1920 and the magnetic ring 1922 are aligned with like polarities (N-N and S-S). This results in a repulsion force (arrow 1945) between the weighted magnetic trigger ring 1920 and the magnetic ring 1922, holding the gear ring 1925 meshed with the gear bushing 1935. In this configuration, the forward rotation of the seat back element 1910 is limited to the full upright (TTOL) position. In a high G-force event (FIG. 18C), a weighted portion of the weighted magnetic trigger ring 1920 may cause rotation of the weighted magnetic trigger ring 1920 in a counter-clockwise direction, thereby aligning the opposite polarity magnetic domains (N-S and S-N). This results in an attraction force (arrow 1947) between the weighted magnetic trigger ring 1920 and the magnetic ring 1922, which may separate the gear ring 1925 from the gear bushing 1935. When this occurs, there may be a rotational freedom of movement of the seat back element 1910, and this may allow for the seat back to tilt forward beyond the full upright (TTOL) position.

FIGS. 19A, 19B and 19C illustrate views of the hinge area (shown as dotted area 115 in FIG. 1) and breakover mechanism of an aircraft passenger seat according to yet another embodiment of the present disclosure. This embodiment may include a seat bottom frame element 2005, a seat back element 2010, a housing 2015, a weighted trigger element 2020 (including a weight 2022 and one or more posts 2025), a plunger mechanism 2030 (including one or more recesses 2035), and a spring 2040. In some embodiments, the seat back element 2010 may be attached to the housing 2015. In some embodiments, the one or more recesses 2035 in the plunger mechanism 2030 match the positions of the one or more posts 2025 in the weighted trigger element 2020. Under normal operating conditions (FIGS. 19A and 19B), the weighted trigger element 2020 may be positioned such that the one or more posts 2025 do not engage into the one or more recesses 2035 in the plunger mechanism 2030, and the plunger mechanism 2030 is engaged into a link 2045 to prevent the seat back from folding forward of the full upright (TTOL) position. In a high G-force event (FIG. 19C), acceleration may cause the weight 2022 to swing forward, thereby rotating the weighted trigger element 2020 and causing the one or more posts 2025 to engage into the one or more recesses 2035 in the plunger mechanism 2030. This, in turn, may cause the spring 2040 to push the plunger mechanism 2030 to disengage from the link 2045. When this occurs, there may be a rotational freedom of movement of seat back element 2010, and this may allow for the seat back to tilt forward beyond the full upright (TTOL) position.

FIGS. 20A and 20B illustrate views of the hinge area (shown as dotted area 115 in FIG. 1) and breakover mechanism of an aircraft passenger seat according to yet another embodiment of the present disclosure. This embodiment may include a seat back element 2110, a weighted inertia link 2115 (including a weight 2120 and a slot 2125), a gear link 2130 (including a shaft 2135) and a pivot link 2140. In some embodiments, the shaft 2135 of the gear link 2130 may be slidably engaged in the slot 2125 of the weighted inertia link 2115. Under normal operating conditions (FIG. 20A), the weighted inertia link 2115 may be positioned such that the shaft 2135 of the gear link 2130 is engaged at the lower end of the slot 2125 of the weighted inertia link 2115 such that a gear feature of the gear link 2130 is meshed with a complementary gear feature of the pivot link 2140, which provides a connection point to a seat bottom frame element, such as the seat bottom frame element 105 (FIG. 1). This may prevent the seat back from folding forward of the full upright (TTOL) position. In a high G-force event (FIG. 20B), acceleration may cause the weight 2120 of the weighted inertia link 2115 to swing forward, thereby rotating the weighted inertia link 2115 and causing the shaft 2135 of the gear link 2130 to slide to the upper end of the slot 2125 of the weighted inertia link 2115 such that the gear feature of the gear link 2130 is separated from the complementary gear feature of the pivot link 2140 (see FIG. 20B). When the separation of the gear feature of the gear link 2130 from the complementary gear feature of the pivot link 2140 occurs, there may be a rotational freedom of movement of seat back element 2110, which may allow for the seat back to tilt forward beyond the full upright (TTOL) position.

Figure 20C:
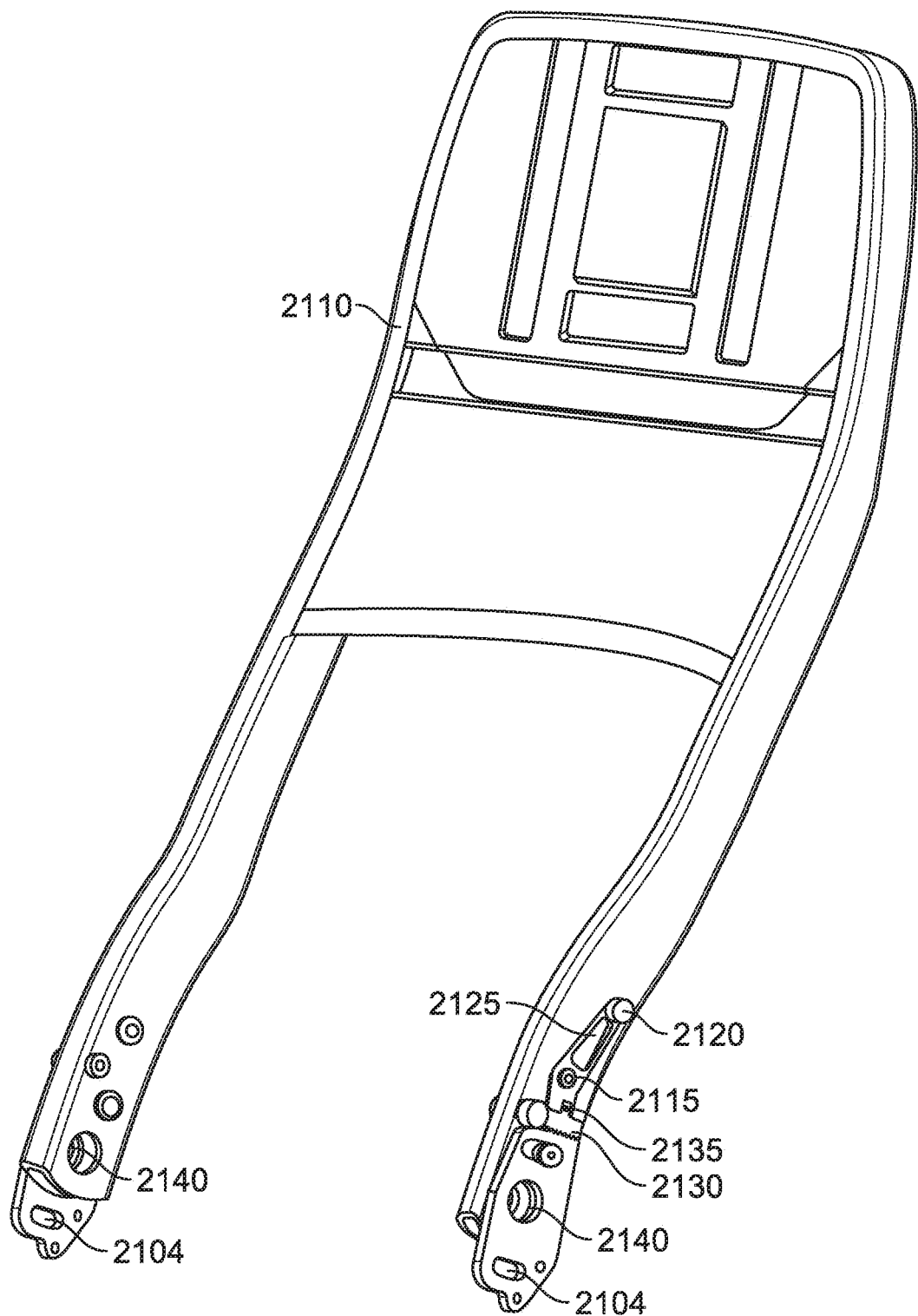
FIG. 20C illustrates another exemplary implementation of a breakover actuation mechanism for some embodiments of the present disclosure.

FIG. 20C illustrates a perspective view of the seat back element 2110 including the breakover actuation mechanism described above in FIGS. 20A and 20B including the weighted inertia link 2115 (including the weight 2120 and the slot 2125), the gear link 2130 (including the shaft 2135), and the pivot link 2140. For example, FIG. 20C illustrates a front perspective view of the seat back element 2110 that shows components of the breakover mechanism and hinge area during normal operations on both sides of the seat back element 2110 where the seat back element 2110 connects to a seat bottom element, such as seat bottom frame element 105 (FIG. 1). In some implementations, the seat back element 2110 connects to the seat bottom frame element at one or more connection locations such as the pivot link 2140 and the slot 2104 having complementary features with connection locations on the seat bottom frame element. Under normal operating conditions as shown in FIG. 20C, the weighted inertia link 2115 may be positioned such that the shaft 2135 of the gear link 2130 is engaged at the lower end of the slot 2125 of the weighted inertia link 2115 such that a gear feature of the gear link 2130 is meshed with a complementary gear feature of the pivot link 2140, which provides a connection point to a seat bottom frame element, such as the seat bottom frame element 105 (FIG. 1), which may prevent the seat baCk from folding forward of the fUll upright (TTOL) position. In a high G-force event (FIG. 20B), acceleration may cause the weight 2120 of the weighted inertia link 2115 to swing forward, thereby rotating the weighted inertia link 2115 and causing the shaft 2135 of the gear link 2130 to slide to the upper end of the slot 2125 of the weighted inertia link 2115 such that the gear feature of the gear link 2130 is separated from the complementary gear feature of the pivot link 2140 (see FIG. 20B).

Figure 21:
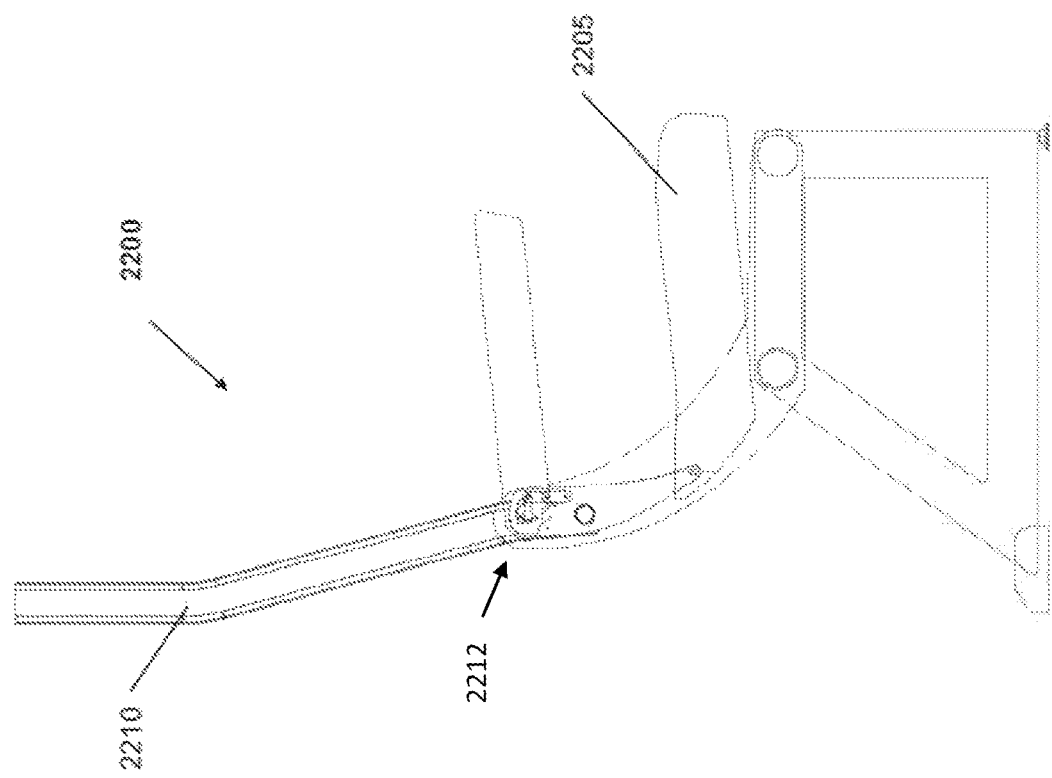
FIG. 21 illustrates another exemplary implementation of a breakover actuation mechanism for some embodiments of the present disclosure shown installed on an exemplary aircraft passenger seat.

FIG. 21 illustrates an exemplary aircraft passenger seat including a breakover mechanism according to yet another embodiment of the present disclosure. The aircraft passenger seat 2200 generally includes a seat bottom element 2205 and a seat back element 2210, for example a backrest, wherein the seat back element 2210 is pivotally-attached to a component of the seat to allow the seat back element 2210 to pivot between an upright taxi, takeoff and landing (TTOL) position and a reclined position for comfort during flight. The aircraft passenger seat 2200 is shown equipped with a dynamic seat back breakover mechanism 2212 generally including a breakover link 2215. The seat back element 2210 is pivotally-attached to the breakover link 2215 such that the breakover mechanism is operable for coupling the seat back element 2210 to the breakover link 2215 in a first operating condition in which the seat back element 2210 is movable with the breakover link 2215 between the upright position and the reclined position, and decoupling the seat back element 2210 from the breakover link 2215 in a second operating condition to allow the seat back element 2210 to move forward relative to the breakover link 2215 past the upright position. The first operating condition may correspond to inertial loading on the seat back element 2210 below a predetermined threshold value, e.g., normal loading, and the second operating condition may correspond to inertial loading on the seat back element above the predetermined threshold value, e.g., excessive loading such as rapid deceleration experienced during a crash event.

Figure 22:
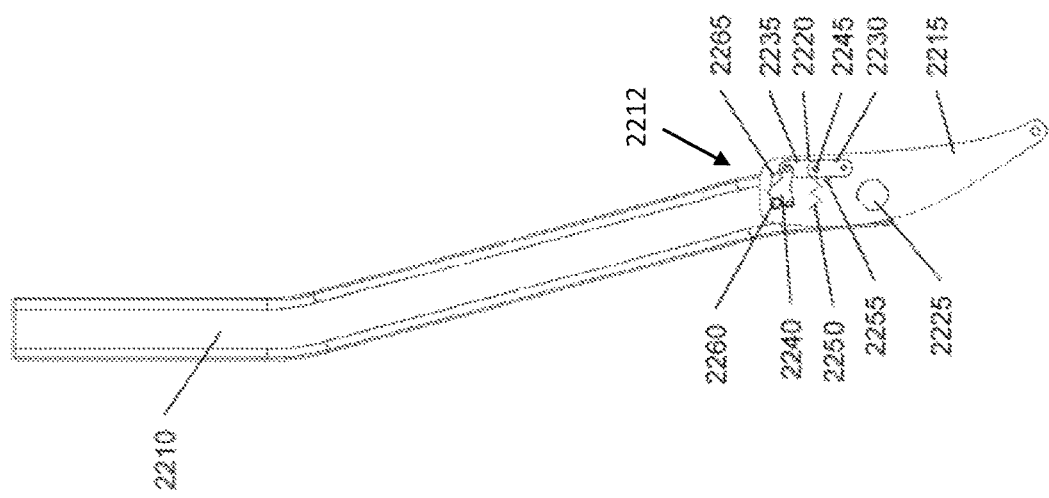
FIG. 22 illustrates the breakover actuation mechanism of the embodiment shown in FIG. 21.

FIG. 22 illustrates the hinge area (shown as dotted area 115 in FIG. 1) and breakover mechanism 2212 according to the embodiment shown in FIG. 21. This embodiment generally includes the seat back element 2210, the breakover link 2215, and an articulating weighted inertia linkage 2220. The seat back element 2210 is pivotally attached to the breakover link 2215 at a seat recline pivot location 2225. Under normal use, the seat back element 2210 tilts backward to recline, and in a high G-force event the seat back element 2210 tilts forward beyond the full upright (TTOL) position. The articulating weighted inertial linkage 2220 includes a lower link 2230, an upper link 2235, and a pawl link 2240. The lower link 2230 is pivotally attached at opposing ends to the breakover link 2215 and the upper link 2235, while the pawl link 2240 is pivotally attached at opposing ends to the breakover link 2215 and the upper link 2235. In this jointed arrangement, each of the lower link 2230 and the pawl link 2240 are pivotally attached at one respective end to the breakover link 2215, while the upper link 2235 is free of attachment to the breakover link 2215 thereby allowing the inertial mass of the links, and particularly the pivotal attachment point 2245 of the lower and upper lower links 2230, 2235, to drive forward in the event of a crash to provide a horizontal force capable of decoupling the seat back element 2210 from the breakover link 2215 as discussed further below.

A tuning spring 2250 attached at one end to the breakover link 2215 and at an opposing end to the pivotal attachment point 2245 of the lower and upper links 2230, 2235 sets the force required to decouple the seat back element 2210 and further biases the articulating weighted inertial linkage 2220 toward the coupled position of the seat back element 2210. As shown in FIG. 22, the tuning spring 2250 pulls the lower link 2230 rearward into contact against a post 2255 carried on the breakover link 2215 operable for limiting rotation of the lower link 2230 rearward past vertical, thus maintaining the linkage in the coupling state. The tuning spring 2250 can be used to set the force necessary to decouple the mechanism (e.g., between 9 G and 11 G). Under normal operating conditions, the pawl link 2240 engages a seat back pin 2260 carried on the seat back element 2210 thereby preventing the seat back element 2210 from moving relative to the breakover link 2215 and tilting forward past the upright (TTOL) position. In a high G-force event sufficient to overcome the spring force, the pawl link 2240 pivots out of engagement with the seat back pin 2260 thereby freeing the seat back pin 2260 to travel forward along a slot 2265 in the breakover link 2215 to allow the seat back element 2210 to tilt forward past the upright (TTOL) position. The slot length determines the length of forward travel of the seat back element 2210 past the upright (TTOL) position. Immediately following the high G-force event the tuning spring 2250 returns the articulating weighted inertial linkage 2220 toward the normal operating condition position, and the surface contour of the pawl link 2240, and particularly the top surface, allows the pawl link 2240 to deflect upon return contact of the seat back pin 2260 to allow the seat back element 2210 to return to the upright (TTOL) position.

FIGS. 23A-23C illustrate views of the decoupling sequence of the breakover mechanism shown in FIG. 21. FIG. 23A shows the coupled state of the seat back element 2210 in the upright (TTOL) position with the pawl link 2240 engaging the seat back pin 2260 to prevent forward seat back element travel pas the upright position. FIG. 23B shows the initial forward travel of the articulating weighted inertia linkage 2220 in response to a high G-force event. FIG. 23C shows the articulating weighted inertia linkage 2220 driven fully forward such that the pawl link 2240 is out of engagement with the seat back pin 2260 leaving the seat back element 2210 free to tilt forward past the upright (TTOL) position.

Figure 24C:
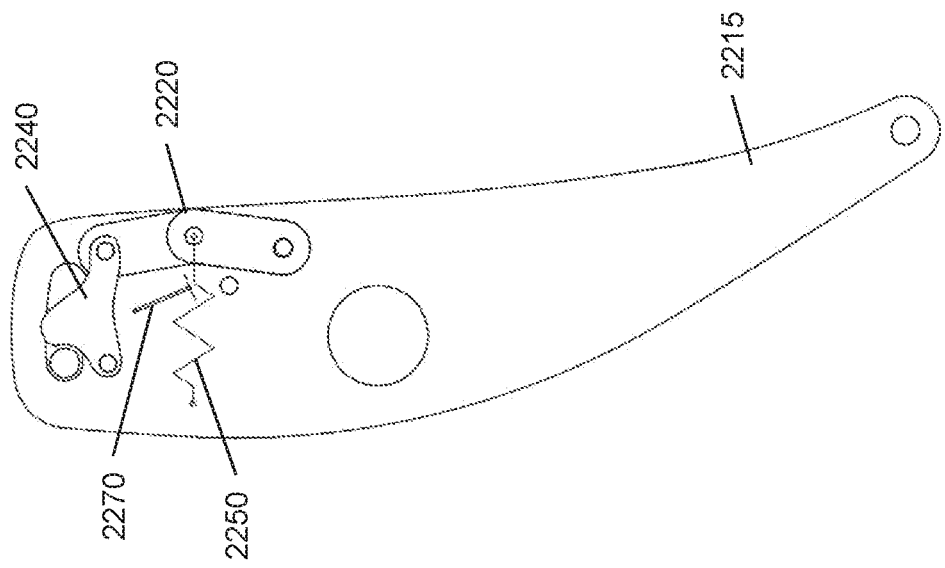
FIGS. 24A-24C illustrate sequential views of the decoupling of the breakover actuation mechanism of the embodiment shown in FIG. 21 further including a weighted assisting pendulum for some embodiments of the present disclosure.
Figure 24B:
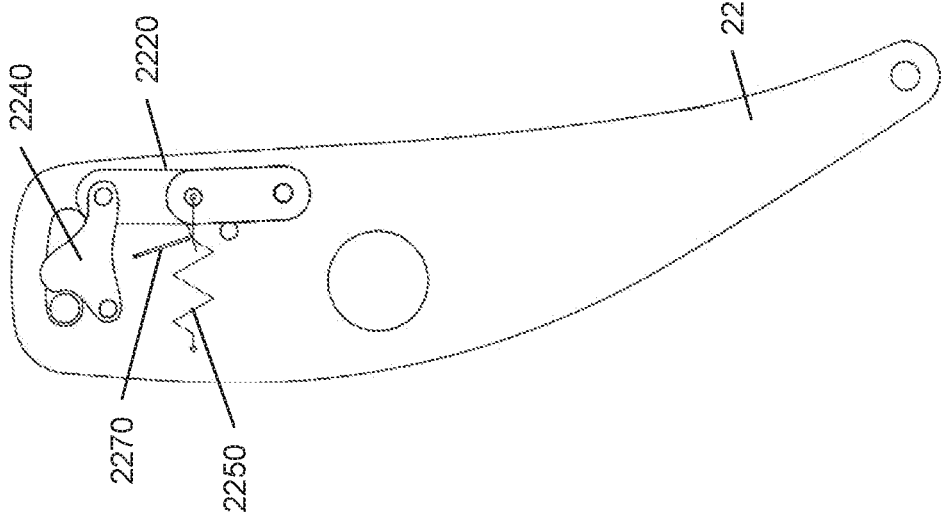
Figure 24A:
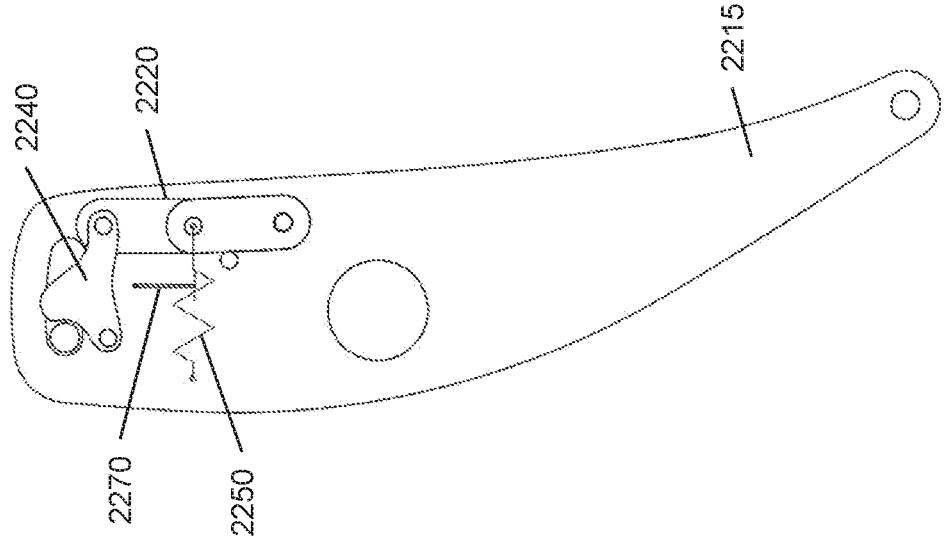

FIGS. 24A-24C illustrate views of the decoupling sequence of the breakover mechanism shown in FIG. 21 further including an optional weighted pendulum 2270 configured apply an additional horizontal force to push the articulating weighted inertia linkage 2220 toward the decoupled state. The weighted pendulum 2270 is pivotally-attached at one end to the breakover link 2215 and hangs below the pawl link 2240 such that in a high G-force event the weighted free end of the pendulum swings forward into contact with the weighted inertia linkage 2220 to apply horizontal assistance force to help decouple the seat back element. The mass and/or lever arm length of the weighted pendulum 2270 can be set to further tune the breakover mechanism along with the spring force of the tuning spring 2250. FIG. 24A shows the coupled state of the breakover mechanism with the weighted pendulum 2270 hanging at rest. FIG. 24B shows initial movement of the weighted pendulum 2270 forward in response to a high G-force event. FIG. 24C shows initial forward decoupling movement of the articulating weighted inertia linkage 2220 with pushing assistance from the weighted pendulum 2270.

Figure 25C:
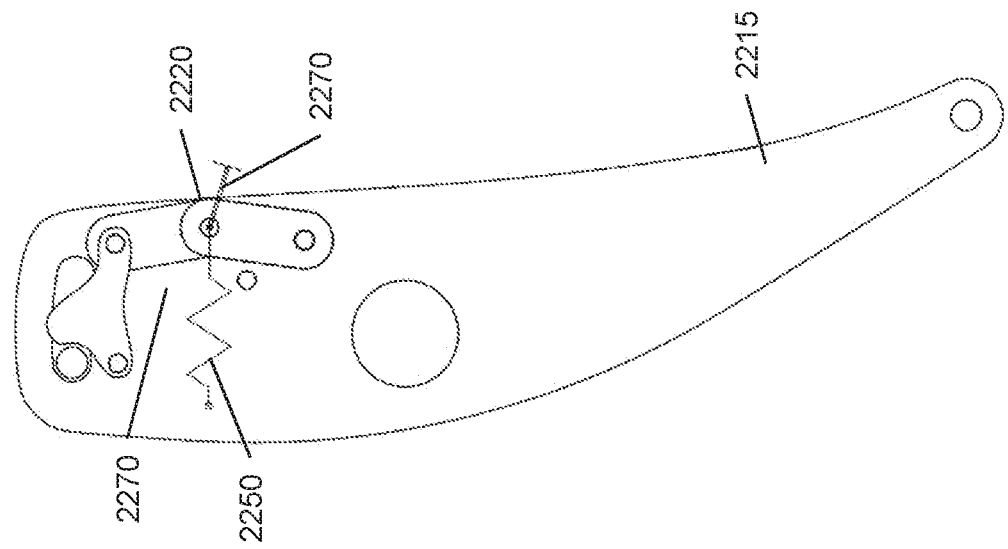
FIGS. 25A-25C illustrate sequential views of the decoupling of the breakover actuation mechanism of the embodiment shown in FIG. 21 further including another weighted assisting pendulum for some embodiments of the present disclosure.
Figure 25B:
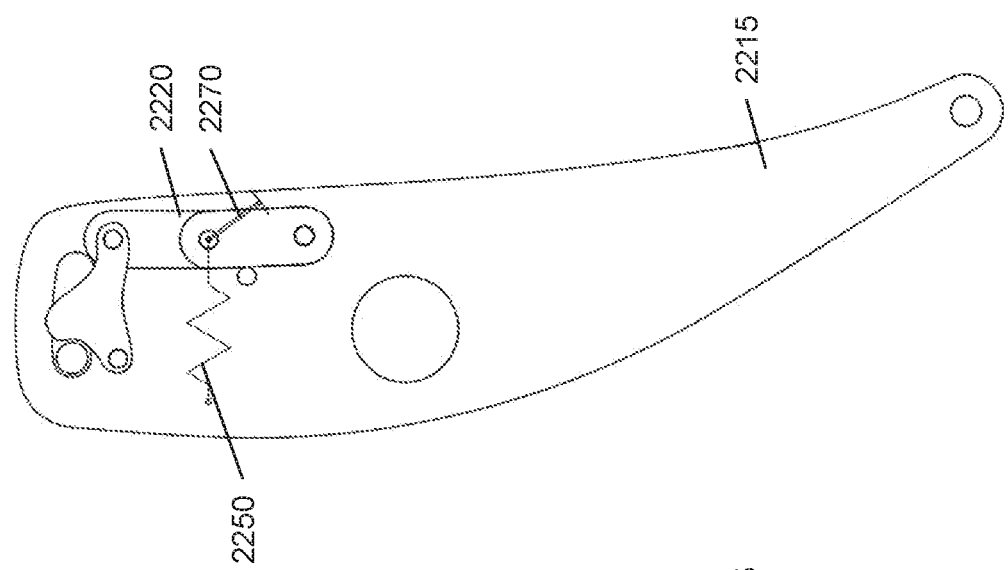
Figure 25A:
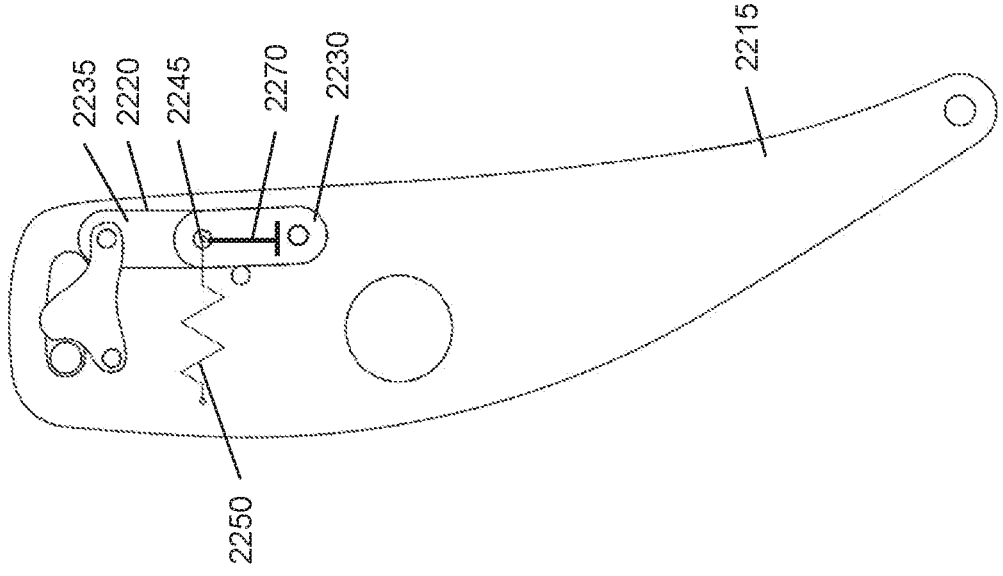

FIGS. 25A-25C illustrate views of the decoupling sequence of the breakover mechanism shown in FIG. 21 including an optional weighted pendulum 2270 arranged to pull the articulating weighted inertia linkage 2220 toward the decoupled state. The weighted pendulum 2270 is pivotally-attached at one end directly to the articulating weighted inertia linkage 2220 to add mass to the articulating weighted inertia linkage 2220. As shown, the weighted pendulum 2270 is pivotally attached near the pivot attachment point 2245 of the lower and upper links 2230, 2235. In a high G-force event, the weighted pendulum 2270 swings forward to provide a horizontal force to pull the articulating weighted inertia linkage 2220 to help decouple the breakover mechanism. The mass and/or lever arm length of the weighted pendulum 2270 can be set to further tune the mechanism along with the spring force of the tuning spring 2250. FIG. 25A shows the coupled state of the breakover mechanism with the weighted pendulum 2270 hanging at rest. FIG. 25B shows initial forward movement of the weighted pendulum 2270 in response to a high G-force event. FIG. 25C shows initial decoupling movement of the articulating weighted inertia linkage 2220 with pulling assistance from the weighted pendulum 2270.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the scope of the present disclosures. The accompanying claims and their equivalents are intended to cover such forms or modifications as would fall within the scope of the present disclosures.

What is claimed is:

1. An aircraft passenger seat with dynamic seat back breakover, comprising:
    a seat back element and a seat back breakover mechanism comprising a breakover link and an articulating weighted inertia linkage;
    wherein the seat back element is pivotally-attached to the breakover and the articulating weighted inertia linkage is operable for coupling the seat back element to the breakover link in a first operating condition in which the seat back element is movable with the breakover link between an upright taxi takeoff and landing (VTOL) position and a reclined position of the seat back element, and decoupling the seat back element from the breakover link in a second operating condition to allow the seat back element to move forward relative to the breakover link past the upright position;
    wherein the first operating condition corresponds to inertial loading on the seat back element below a predetermined threshold value and the second operating condition corresponds to inertial loading on the seat back element above the predetermined threshold value.

2. The aircraft passenger seat of claim 1, wherein the second operating condition corresponds to a crash event.

3. The aircraft passenger seat of claim 1, wherein the predetermined threshold value is at least 9 G.

4. The aircraft passenger seat of claim 1, wherein the articulating weighted inertia linkage comprises:
    a lower link pivotally attached at one end to the breakover
    a pawl link pivotally attached at one end to the breakover link; and
    an upper link pivotally attached to each of the lower link and the pawl link and free of attachment to the breakover link;
    wherein in a coupled state corresponding to the first operating condition the articulating weighted inertia linkage prevents relative movement between the seat back element and the breakover link, and in a decoupled state corresponding to the second operating condition the articulating weighted inertia linkage allows relative movement between the seat back element and the breakover link.

5. The aircraft passenger seat of claim 4, further comprising a tuning spring coupled between the breakover link and the articulating weighted inertia linkage operable for setting the predetermined threshold value of inertial loading and biasing the articulating weighted inertia linkage toward the coupled state.

6. The aircraft passenger seat of claim 4, wherein the breakover link comprises a rotation-limiting post for preventing the articulating weighted inertia linkage from rotating rearward past the coupled state.

7. The aircraft passenger seat of claim 4, wherein the seat back element carries a seat back pin engaged in an elongated slot of the breakover link, wherein in the coupled state in the first operating condition the pawl link engages the seat back pin to prevent seat back pin travel along the elongated slot, and in the decoupled state in the second operating condition the pawl link is pivoted out of engagement with the seat back pin to free the seat back pin to travel along a length of the elongated slot.

8. The aircraft, passenger seat of claim 4, further comprising a weighted pendulum coupled to the breakover link operable for applying a horizontal pushing force on the articulating weighted inertia linkage in the second operating condition.

9. The aircraft passenger seat of claim 4, further comprising a weighted pendulum coupled to the articulating weighted inertia linkage operable for applying a horizontal pulling force on the articulating weighted inertia linkage in the second operating condition.

10. An aircraft passenger seat with dynamic seat back breakover, comprising:
    a seat back element configured to move in a first operating condition between an upright taxi takeoff and landing (TTOL) position and a reclined sitting position, and in a second operating conditioned move forward past the upright sitting position, the first operating condition corresponding to inertial loading on the seat back element below a predetermined threshold value and the second operating condition corresponding to inertial loading on the seat back element above the predetermined threshold value; and
    a seat back breakover mechanism comprising a breakover link and an articulating weighted inertia linkage, the articulating weighted inertia linkage operable for coupling seat back element and breakover link movement in the first operating condition and decoupling seat hack element and breakover link movement in the second operating condition, wherein the articulating weighted inertia linkage decouples the seat back element and breakover link movement in response to inertial loading above the predetermined threshold value.

11. The aircraft passenger seat of claim 10, wherein the predetermined threshold value is at least 9 G.

12. The aircraft passenger seat of claim 10, wherein the articulating weighted inertia linkage comprises:
- a lower link pivotally attached at one end to the breakover link;
- a pawl link pivotally attached at one end to the breakover link; and
- an upper link pivotally attached to each of the lower link and the pawl link and free of attachment to the breakover link;
- wherein in a coupled state corresponding to the first operating condition the articulating weighted inertia linkage prevents relative movement between the seat back element and the breakover link, and in a decoupled state corresponding to the second operating condition the articulating weighted inertia linkage allows relative movement between the seat back element and the breakover link.

13. The aircraft passenger seat of claim 12, further comprising a tuning spring coupled between the breakover link and the articulating weighted inertia linkage operable for setting the predetermined threshold value of inertial loading and biasing the articulating weighted inertia linkage toward the coupled state.

14. The aircraft passenger seat of claim 12, wherein the breakover link comprises a rotation-limiting post for preventing the articulating weighted inertia linkage from rotating rearward past the coupled state.

15. The aircraft passenger seat of claim 12, wherein the seat back element carries a seat back pin engaged in an elongated slot of the breakover link, wherein in the coupled state in the first operating condition the pawl link engages the seat back pin to prevent seat back pin travel along the elongated slot; and in the decoupled state in the second operating condition the pawl link is pivoted out of engagement with the seat back pin to free the seat back pin to travel along a length of the elongated slot.

16. The aircraft passenger seat of claim 12, further comprising a weighted pendulum coupled to the breakover link operable for applying a horizontal pushing force on the articulating weighted inertia linkage in the second operating condition.

17. The aircraft passenger seat of claim 12, further comprising a weighted pendulum coupled to the articulating weighted inertia linkage operable for applying a horizontal pulling force on the articulating weighted inertia linkage in the second operating condition.

18. An aircraft passenger seat with dynamic seat back breakover, comprising:
- a pivotally-attached seat back element; and
- a seat back breakover mechanism comprising an articulating weighted inertia linkage operable for coupling the seat back element in a first operating condition in which the seat back element is movable between an upright taxi takeoff and landing (TTOL) position and a reclined position, and decoupling the seat back element in a second operating condition to allow the seat back element to move forward past the upright position, the first operating condition corresponding to inertial loading below a predetermined threshold value and the second operating condition corresponding to inertial loading above the predetermined threshold value;
- wherein the articulating weighted inertia linkage comprises:
- a lower link pivotally attached at one end to a Brea over link,
- a pawl link pivotally attached at one end to the breakover link; and
- an upper link pivotally attached to each of the lower link and the pawl link and free of attachment to the breakover link;
- wherein a seat back pin carried on the seat back element is engaged in an elongated slot of the breakover link, and wherein in the first operating condition the pawl link engages the seat back pin to prevent seat back pin travel along a length of the elongated slot and in the second operating condition the pawl link is pivoted out of engagement with the seat back pin to free the seat back pin to travel along the length of the elongated slot.

19. The aircraft passenger seat of claim 18, further comprising a tuning spring coupled between the breakover link and the articulating weighted inertia linkage operable for setting the predetermined threshold value of inertial loading and biasing the articulating weighted inertia linkage toward a coupled state.

* * * * *